United States Patent [19]

Zick et al.

[11] Patent Number: 5,774,593

[45] Date of Patent: Jun. 30, 1998

[54] AUTOMATIC SCENE DECOMPOSITION AND OPTIMIZATION OF MPEG COMPRESSED VIDEO

[75] Inventors: Gregory L. Zick, Kirkland; Hain-Ching H. Liu, Seattle, both of Wash.

[73] Assignee: University of Washington, Seattle, Wash.

[21] Appl. No.: 806,395

[22] Filed: Feb. 26, 1997

Related U.S. Application Data

[63] Continuation of Ser. No. 506,092, Jul. 24, 1995, abandoned.

[51] Int. Cl.[6] .................................................. G06K 9/00
[52] U.S. Cl. ........................................ 382/236; 382/235
[58] Field of Search .................................. 348/403, 395,
348/420, 700, 701, 699, 169, 170, 171,
172, 416, 412, 413, 421; 358/433, 432,
431, 430, 429, 428, 426, 427, 261.3, 261.2,
261.1, 262.1; 382/232, 233, 235, 236, 237,
238, 239, 244, 248, 250, 251, 252, 253,
107, 166, 171, 172, 240, 270, 278

[56] References Cited

U.S. PATENT DOCUMENTS

| | | | |
|---|---|---|---|
| 4,823,184 | 4/1989 | Belmares-Sarabia | 358/27 |
| 5,099,322 | 3/1992 | Gove | 348/700 |
| 5,227,878 | 7/1993 | Puri et al. | 358/136 |
| 5,274,442 | 12/1993 | Murakami et al. | 358/133 |
| 5,278,647 | 1/1994 | Hingorani et al. | 358/136 |
| 5,307,441 | 4/1994 | Tzeng | 395/2.31 |

*Primary Examiner*—Leo H. Boudreau
*Assistant Examiner*—Bijan Tadayon
*Attorney, Agent, or Firm*—Ronald M. Anderson

[57] ABSTRACT

Analysis of video data in an MPEG compressed format to identify scene changes to facilitate indexing to access specific video frames and to improve data compression and/or quality of the compressed video. MPEG compressed video data include I-pictures, P-pictures, and B-pictures. Scene changes are identified by analyzing P-pictures using average error power, based upon direct cosine transform components in the compressed data, and/or using an interframe correlation between a P-picture and its past reference frame. When a scene change occurs, average error power becomes large and interframe correlation between frames becomes substantially zero. Alternatively (or in addition), B-pictures in a video slot can be analyzed, in terms of interframe correlation between past and future reference frames, using either an AND analysis technique or an OR analysis technique. The AND analysis identifies a scene change when two or more B-pictures between two reference frames defining the video slot all imply a scene change, while the OR analysis indicates that a scene change has not occurred in the video slot if one B-picture implies that a scene change has not occurred. Once the scene changes have been identified, all I-pictures not occurring at a scene change are converted to P-pictures, and all P-pictures immediately following a scene change are converted to I-pictures. This step improves compression and/or quality of the compressed video, since P-pictures require less data than do I-pictures, and fewer I-pictures will be used in the compressed data following this step.

29 Claims, 22 Drawing Sheets

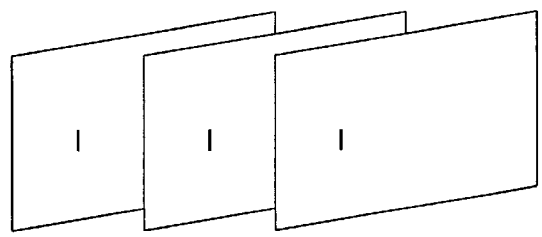
FIG. 3A   *(PRIOR ART)*
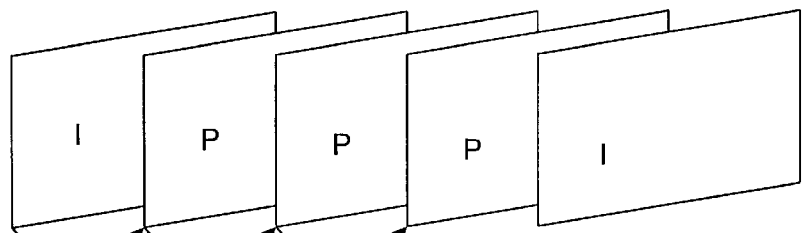
FORWARD PREDICTION
FIG. 3B   *(PRIOR ART)*
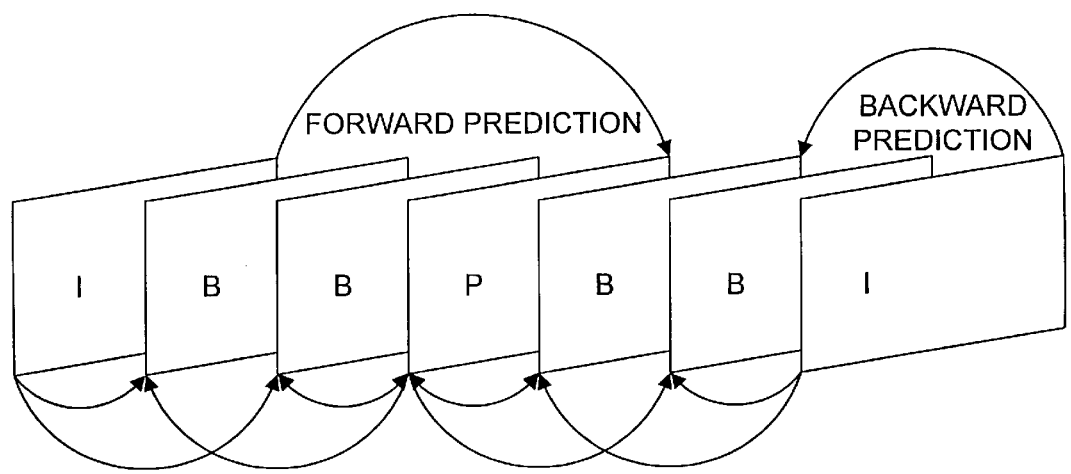
BIDIRECTIONAL PREDICTION
FIG. 3C   *(PRIOR ART)*
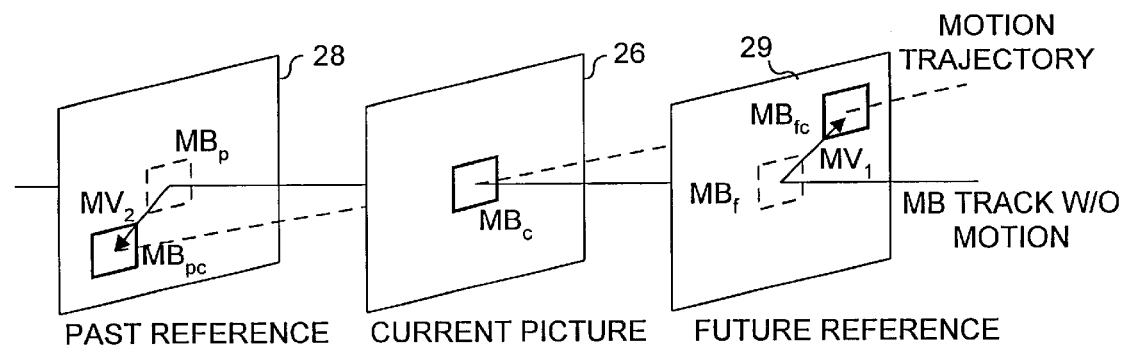
FIG. 4A   *(PRIOR ART)*

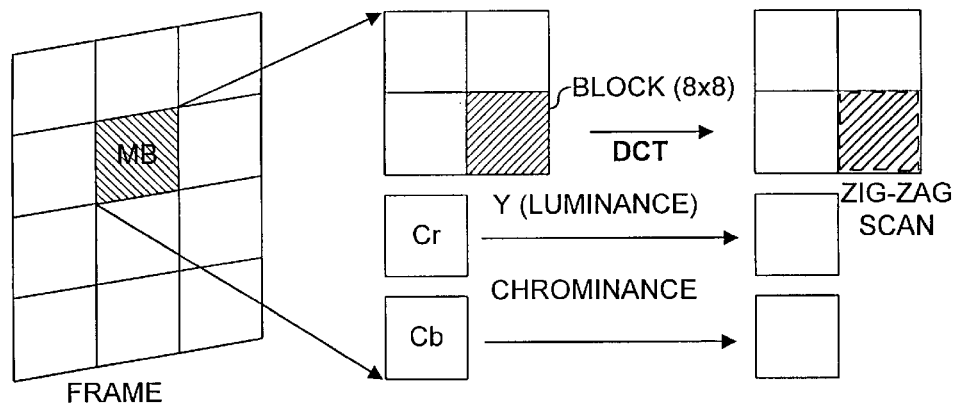
FIG. 4B  *(PRIOR ART)*
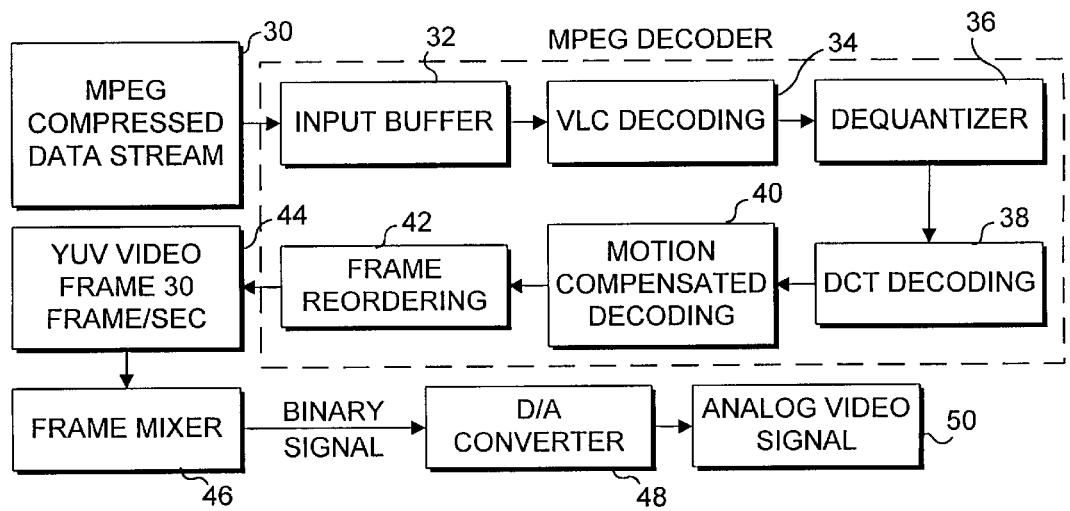
FIG. 5  *(PRIOR ART)*
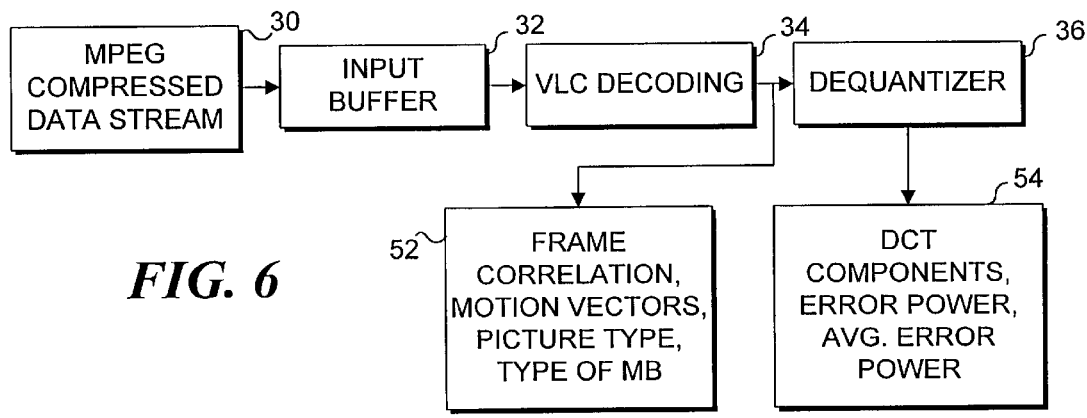
FIG. 6

AUTOMATIC SCENE DECOMPOSITION AND OPTIMIZATION OF MPEG COMPRESSED VIDEO

This application is a file wrapper continuation application, based on prior copending application Ser. No. 08/506,092, filed on Jul. 24, 1995, the benefit of the filing date of which is hereby claimed under 35 U.S.C. §120, now abandoned.

FIELD OF THE INVENTION

The present invention generally pertains to a method and system for processing compressed digitized video data to extract video content, and more specifically, to processing data used for motion picture expert group (MPEG) compressed video to identify scene changes within a video sequence.

BACKGROUND OF THE INVENTION

Recent advances in optical and magnetic storage techniques have made digitized multimedia databases feasible. Wide-band multimedia communication, fiber optics, and wireless communication greatly facilitate the distribution of multimedia data across networks. However, current bandwidth and storage limitations for multimedia data dictate that standardized compression algorithms be applied to the data to reduce the size of the data when stored and transmitted.

Among the different types of data comprising multimedia information, video data are the most complicated and difficult to process due to the relatively large file size required to store the data. For example, an hour-long, digital VHS-quality video that has a resolution of 352×240 pixels/frame, with 24-bit color, and playing at 30 frames/sec requires more than 27 Gbytes of storage. Compressing the video data by applying the MPEG compression standard produces a file that is about 500 Mbytes in size.

Given the relatively large size of even compressed video data, organizing and managing the data is a difficult task. Current video data systems offer only rudimentary techniques such as keyword-based searches and fast forward/backward browsing to access specific portions of a video work. Keyword-based database systems allow retrieval of specific portions of the video data using standard query languages such as SQL, which supports the functions of logical combinations, conjunctions (AND operators), disconjunctions (OR operators), and negations NOT operators). However, keyword-based data retrieval systems cannot precisely and uniquely represent video data content. For example, a keyword phrase such as "red color" that might be used to reference a portion of the video data in which a woman first appears wearing a dress of that color may be too subjective and subject to different interpretation by different people, i.e., some people might perceive the dress to be orange-red in color.

A different problem arises when attempting to identify a specific portion of video data by browsing at high speed. Most existing computer systems do not support fast-forward/backward browsing without skipping video frames due to the processing load required to support the video bandwidth. Furthermore, searches made using the fast-forward/backward browsing operation are slow and inefficient, even if performed properly.

Clearly, proper management of video data to enable specific portions to be accessed can more readily be achieved if the video data are indexed using an objective indexing technique. Most video data include a plurality of scene changes that occur when the camera viewpoint changes or when the subject of the video data changes. Scene changes are thus an objective criteria for indexing video data. If the scene changes (or frame cuts) can be identified and indexed in the video data, searching the video data for a particular subject becomes much more efficient and accurate, since the search will no longer depend upon subjective keywords. Any browsing required to pin point a specific point in the video data should be limited to a defined portion of the video data that is disposed between two indexed scene changes.

Current techniques available to detect scene changes either employ a histogram comparison between successive video frames or compare the color spectrum of successive frames. The presumption in these techniques is that a detectable shift in color will be evident in two successive frames that bracket a scene change. These techniques often produce erroneous results because changes in lighting can cause a shift in color between successive frames that depict the same scene. Thus, a more accurate method for detecting and indexing scene changes in video data is required.

Such a technique can also improve upon the compression ratio and/or quality of video data compressed using the MPEG standard. Under the MPEG standard, there are three types of pictures in the compressed video data: Intra pictures (I-pictures), Predicted pictures (P-pictures), and Bidirectional-predicted pictures (B-pictures). The type of picture indicates the relationship of that frame to other frames in a video sequence. An I-picture is independent of other frames; a P-picture is related to a past reference frame (an I-picture or P-picture); and each B-picture is related to past and future reference frames (the previous and next I-pictures or P-pictures). The MPEG standard decomposes every picture into macroblocks (MBs) and specifies a technique called motion compensation at the MB level to minimize the differences between a current picture and its reference(s). The compressed data stores only the differences between the current picture and its reference picture (s), so that the total amount of compressed data required to represent the video work is much less than the original uncompressed video data.

More compressed data are required to represent each I-picture than are required for each P-picture. In a typical compressed video data stream, there are more I-pictures than are required. It should only be necessary to have an I-picture at the start of each scene change, but many more I-pictures are normally included in compressed video data, appearing in a repeating sequence of the three picture types of frames, e.g., IBBPBBPBBIBBP. An improvement in compression and/or quality might therefore be achieved by identifying scene changes and only using those types of pictures that require the least amount of compressed data wherever possible. The prior art techniques for identifying scene changes discussed above have not been sufficiently accurate or fast enough to enable the improvement in compression and/or quality to be achieved, for example, by limiting I-pictures to the first frame in each scene. Accordingly, a more efficient technique to identify scene changes can also be applied to improve the quality and/or compression of video data.

SUMMARY OF THE INVENTION

In accordance with the present invention, a method is defined for detecting a scene change in video data that represents a plurality of successive video frames. The method includes the step of determining an interframe correlation between successive video frames. A measure indicative of a scene change between two successive video frames is determined as a function of the interframe correlation between the two successive video frames. The measure is then compared to a threshold value. Finally, as a function of a difference between the measure and the threshold value, the method indicates whether the scene change has occurred between the two successive video frames.

For P-type video frames, an optional step determines an error power between each P-type frame and its past reference frame to serve as an additional measure indicative of a scene change. To determine the error power between successive video frames, each of the successive video frames are divided into a plurality of MBs. Each MB includes a defined number of contiguous pixels, and the plurality of MBs include a plurality of forward-predicted MBs. For each forward-predicted MB comprising the successive video frames, a discrete cosine transform is applied to at least a portion of the forward-predicted MB to determine a plurality of spectral components. A sum of the spectral components of the forward-predicted MB squared is determined; the sum is equal to a total error power of the forward-predicted MB. Next, an average total error power for each of the successive video frames is determined by summing the total error power for the forward-predicted MBs in each video frame to produce a video frame error power and dividing the video frame error power by the number of forward-predicted MBs for which the total error power was summed. There is an indication that a scene cut occurred between an immediately previous video frame and a current video frame if the average total error power for the current frame exceeds the threshold.

The method may also include the step of compressing the video data to represent the successive video frames using I-pictures, P-pictures, and B-pictures. Each I-picture is independent of any other type of pictures; each P-picture is related to a previous I-picture or a previous P-picture; and, each B-picture is related to the previous I-picture or P-picture and to a next I-picture or a next P-picture. The step of determining the interframe correlation between successive video frames then includes the step of dividing each of the I-pictures, P-pictures, and B-pictures into a number, N(T), of MBs. Each MB includes a defined number of contiguous pixels. Similarly, each P-picture includes a number, N(F), of forward-predicted MBs, and in addition to the number N(F) of forward-predicted MBs, each B-picture also includes a number, N(B), of backward-predicted MBs and a number, N(A), of bidirectional-predicted MBs. For each P-picture, the interframe correlation between the P-picture and a past reference picture is determined and is equal to N(F)/N(T). For each B-picture, an indicator of scene changes between the B-picture and one of a past reference picture and a future reference picture for the B-picture is determined as a function of the interframe correlation between the past reference picture and the future reference picture of the B-picture. This indicator comprises a function of a difference D, which is equal to N(F)−N(B) for the B-picture. Preferably, the difference D is weighted, producing a weighted difference, W(D), which is equal to D/N(A) for the B-picture. The interframe correlation between each B-picture and its past reference picture, C(P), is a function of N(F), N(A), and N(T). In addition, the interframe correlation between each B-picture and its future reference picture, C(F), is a function of N(B), N(A), and N(T). A measure of continuity for the B-picture is equal to a minimum of C(P) and C(F) for the B-picture.

Alternatively, the indicator of the scene change between the B-picture and one of its past and future reference pictures is an inverse of the measure of continuity for the B-picture. As a further alternative, the interframe correlation for the B-picture is determined as a function of motion vectors between contiguous MBs in the B-picture.

The method further includes the step of adaptively determining the threshold as a time varying function of the measure. To adaptively determining the threshold, the measure is filtered over time to remove peaks, producing a time varying filtered signal; the threshold is then determined as a function of the time varying filtered signal. The video data may have been compressed before being processed to detect the scene change. If so, the threshold is a function of at least a current measure, a past measure, and a future measure relative to a current video frame. However, the video data may instead be processed to detect the scene change while being compressed. If so, the threshold is a function of a current measure and a plurality of past measures.

Another step of the method is generating a list of scene changes, where each scene change is identified by reference to a video frame number.

An additional aspect of the present invention is directed to a system for detecting scene changes in video data representing a plurality of successive video frames. The system includes a processor that executes machine instructions embodied in software, to carry out processing of the video data so as to implement functions that are determined by the machine instructions. A volatile memory that is accessible by the processor is used to temporarily store the machine instructions executed by the processor and to temporarily store the video data. A nonvolatile storage device stores the machine instruction executed by the processor and stores the video data and output data that include a list of the scene changes detected in the video data. The machine instructions cause the processor to implement functions that are generally consistent with the steps of the method discussed above.

Yet another aspect of the present invention is directed to an article of manufacture that is adapted for use by a computer to detect a scene change in video data representing a plurality of successive video frames. The articles comprises a nonvolatile memory device in which are stored a plurality of machine instructions that are executable by the computer. The plurality of machine instructions comprise a computer program that causes the computer to implement functions that are generally consistent with the step of the method.

Still another aspect of the invention pertains to a method for increasing a compression and/or a quality of compressed video data that represent successive video frames. The compressed video data include intra-pictures (I-pictures), predicted-pictures (P-pictures), and bidirectional-predicted pictures (B-pictures). The I-pictures are each independent of any other type of picture; the P-pictures are each related to a previous I-picture or a previous P-picture; and the B-pictures are each related to the previous I-picture or the previous P-picture and to a next I-picture or a next P-picture. Scene changes between successive video frames of the compressed video are identified, for example, as described above. The improvement in compression and/or quality is then achieved by ensuring that I-pictures always immediately follow a scene change and do not occur at any other points in the compressed video data, and by ensuring that P-pictures do not immediately follow a scene change.

Preferably, the compressed video data are produced in a contemporaneous process, just before the steps in the preceding paragraph are implemented.

Spatial matching between successive video frames of a video slot can be used to determine the video frame within the video slot at which a scene change occurs. Use of spatial matching includes the step of determining color histograms for each video frame comprising a video slot. Each color histogram comprises a plurality of color bins that indicate a frequency for each of a plurality of colors in the video frame. Differences between corresponding bins of the color histograms for successive video frames within the video slot are determined, and a scene change is identified where the differences between the corresponding bins of the color histograms for two successive video frames is a maximum.

Alternatively, the compressed video data are produced in a separate process that is generally not contemporaneous with the steps of identifying the scene change frames and ensuring the disposition of I and P-pictures relative to the identified scene changes.

Preferably, the step of ensuring that I-pictures always immediately follow a scene change comprises the step of changing any I-picture that does not immediately follow a scene change to a P-picture. Similarly, the step of ensuring that P-pictures do not immediately follow a scene change comprises the step of changing any P-picture that immediately follows a scene change to an I-picture.

The method also includes the step of identifying video slots. Each video slot includes a plurality of video frames, and each video slot begins and ends with a reference frame. The reference frames comprise either an I-picture or a P-picture. All video frames occurring between reference frames at the beginning and the end of a video slot are encoded in the compressed video data as B-pictures.

A system that implements functions and an article of manufacture that includes a computer program to implement functions generally consistent with the steps of the immediately preceding method are other aspects of the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 7:
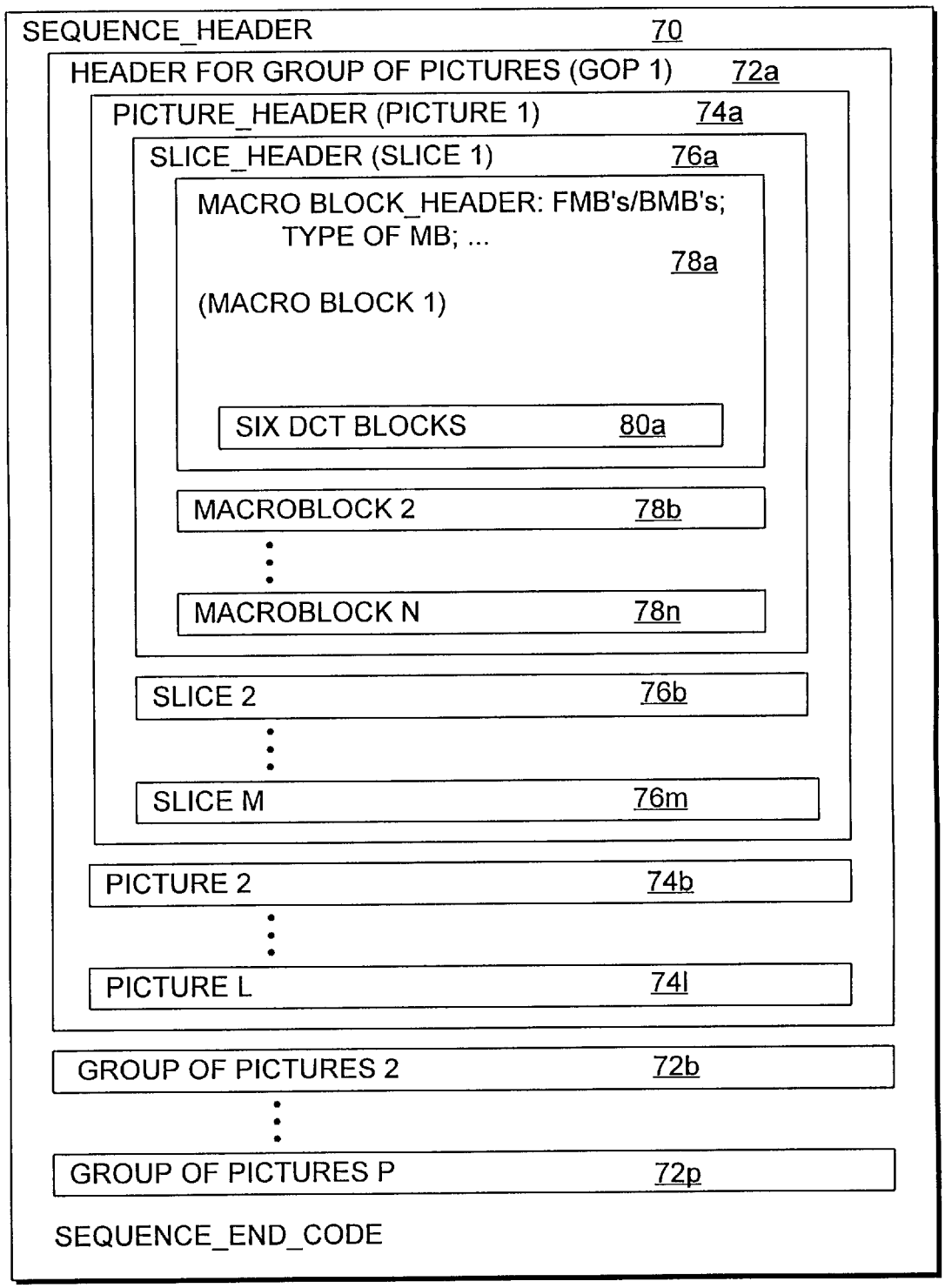
Figure 8:
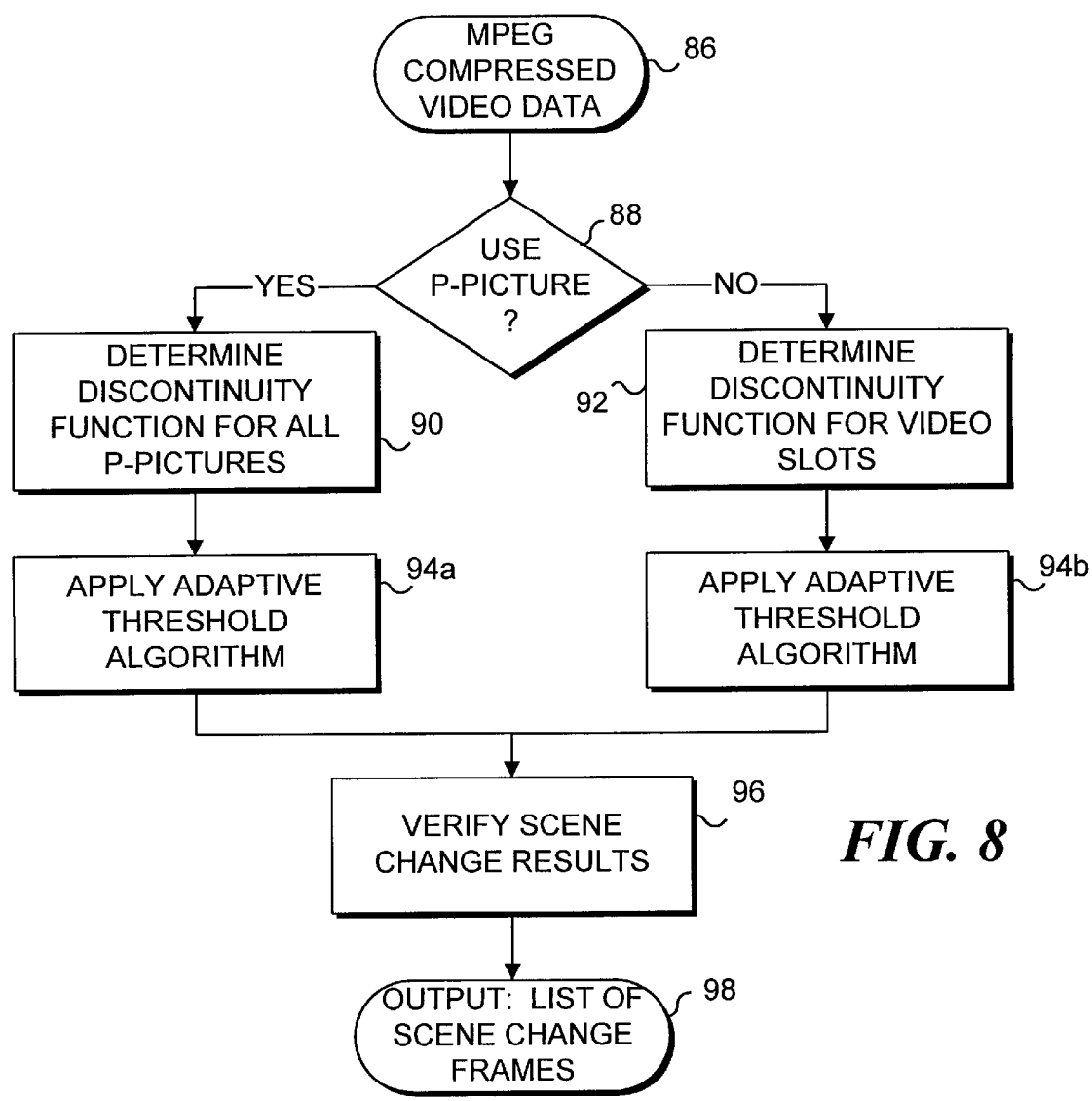
Figure 9A:
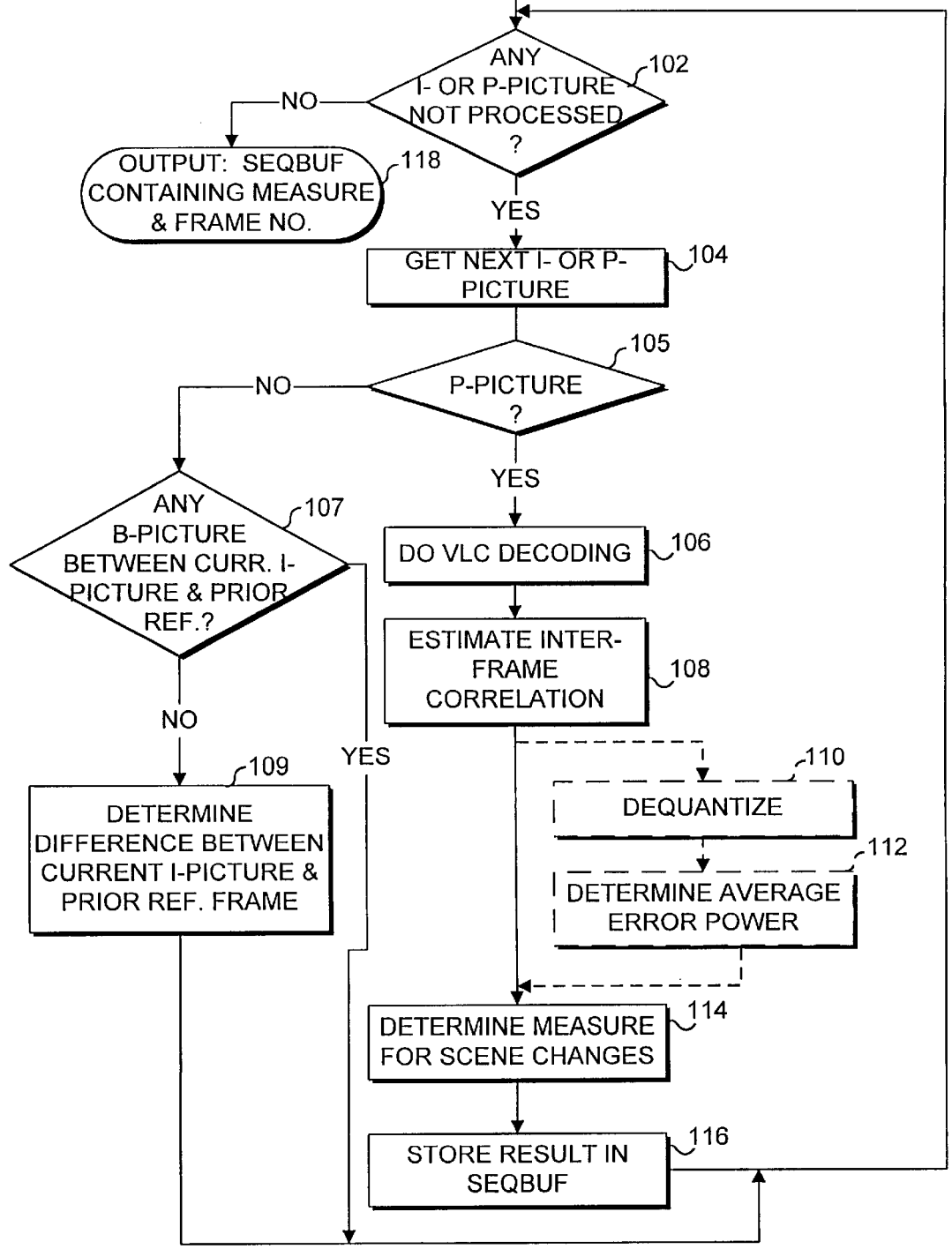
Figure 9B:
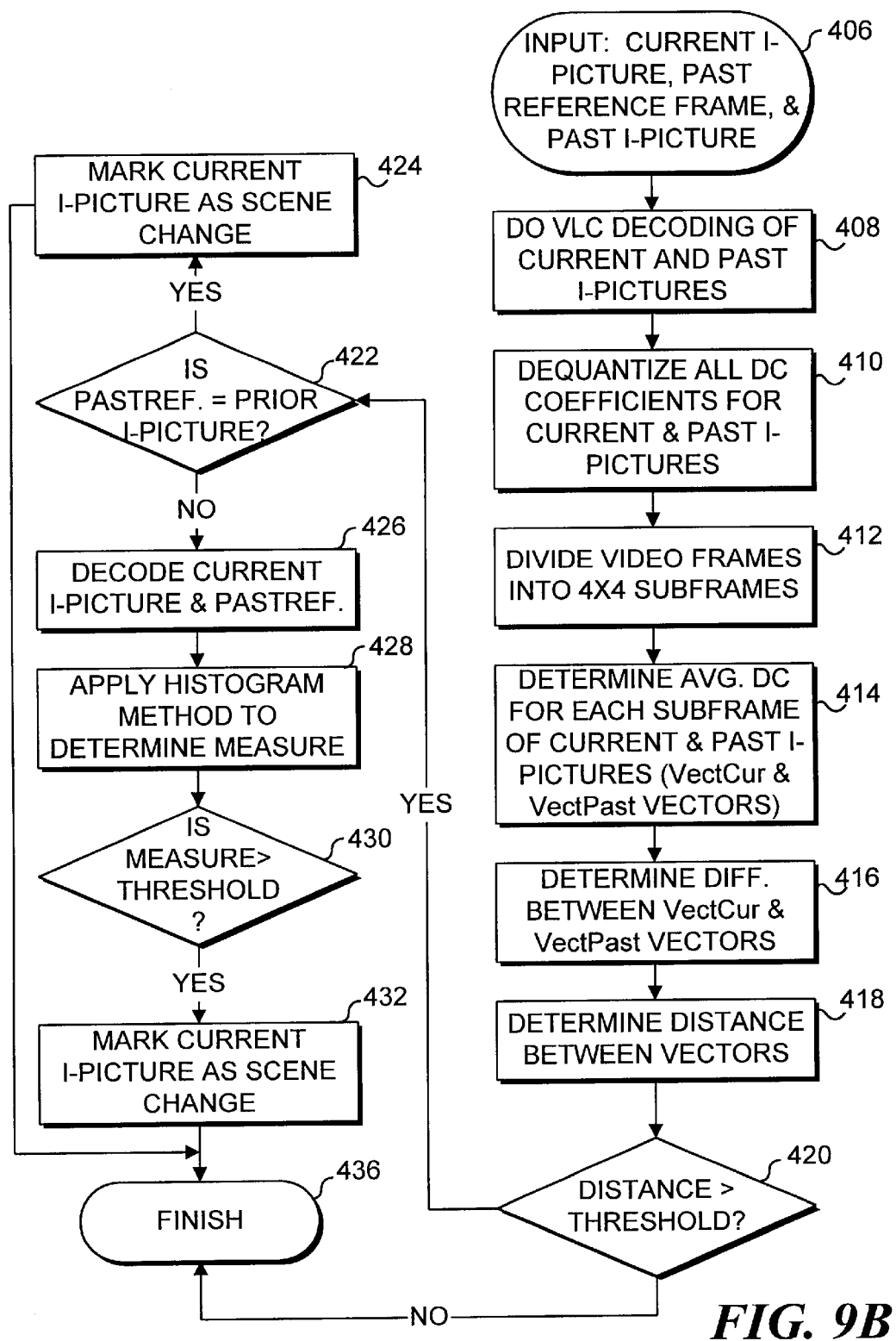
Figure 10:
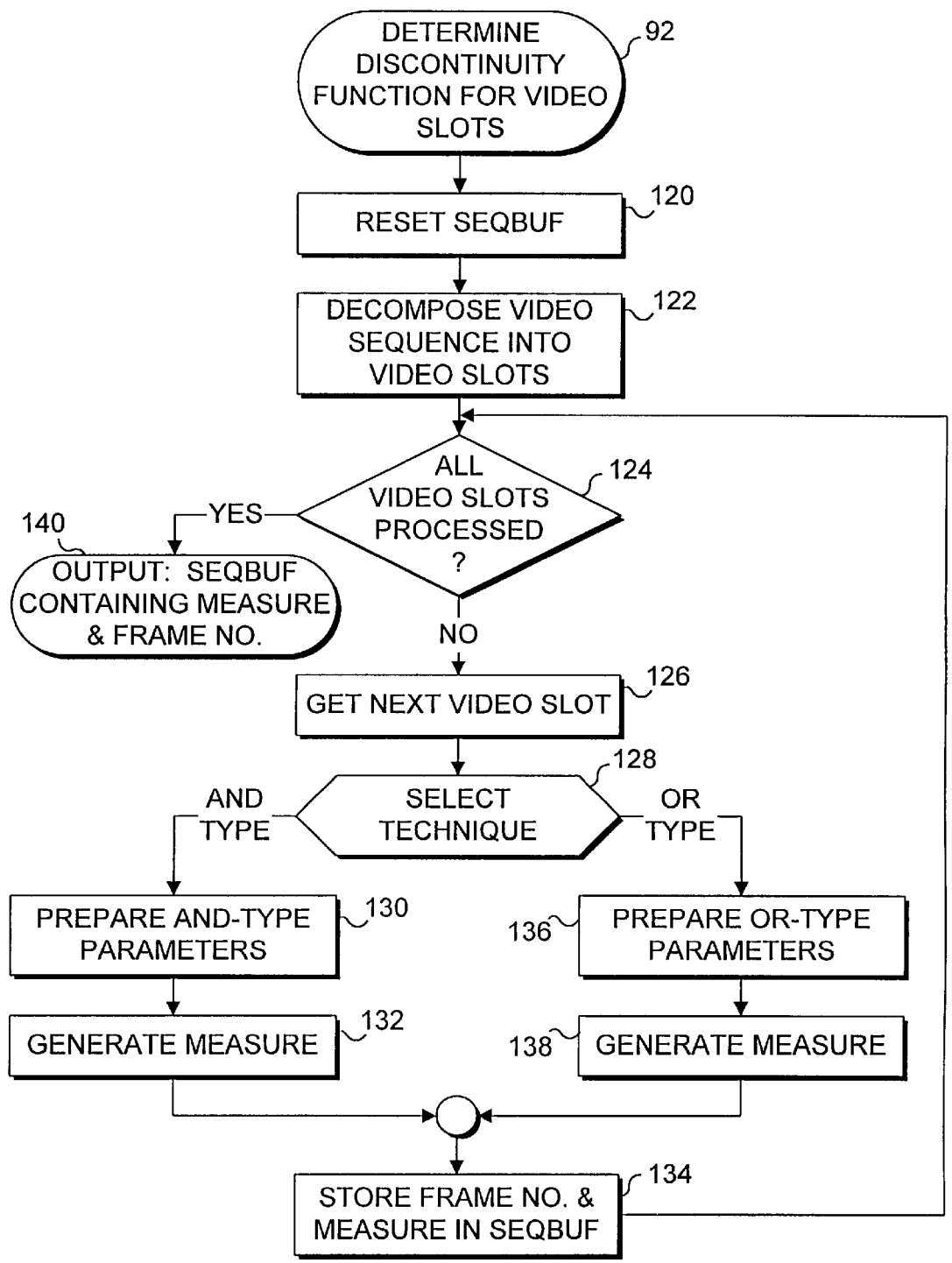
Figure 11:
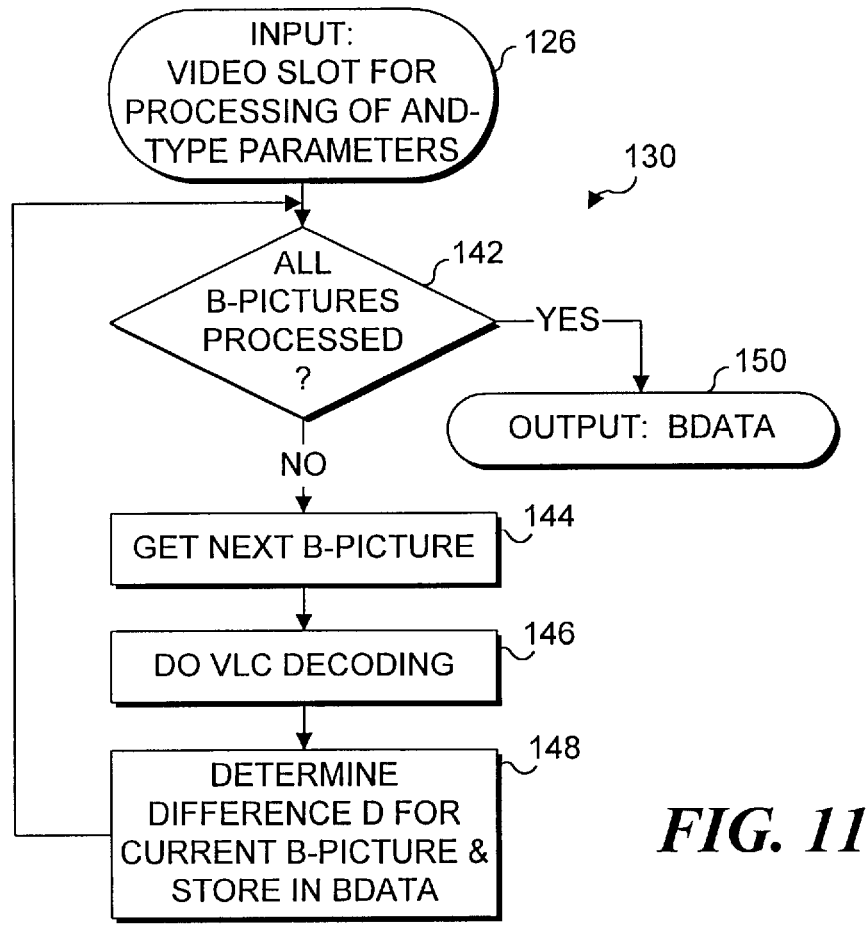
Figure 13:
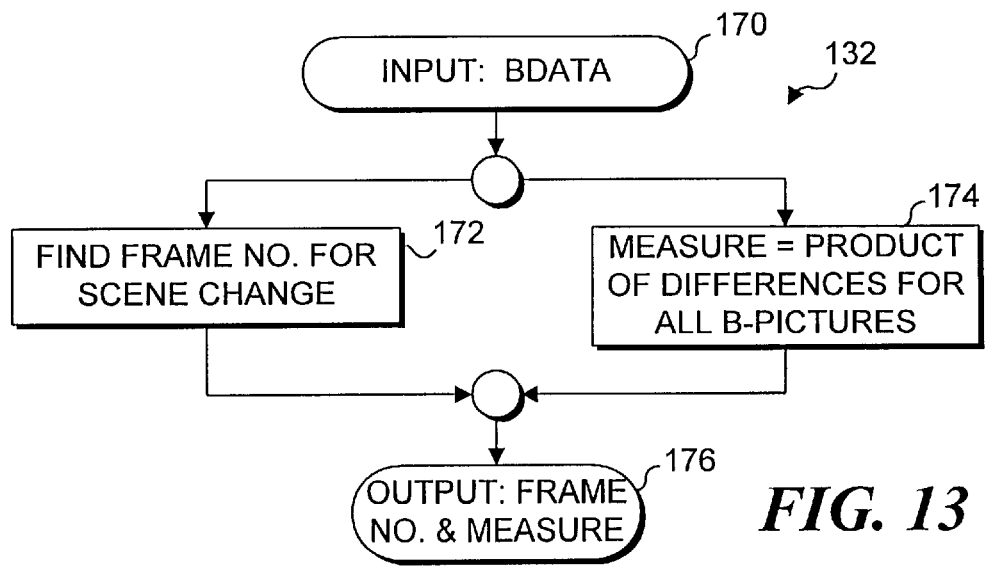
Figure 12:
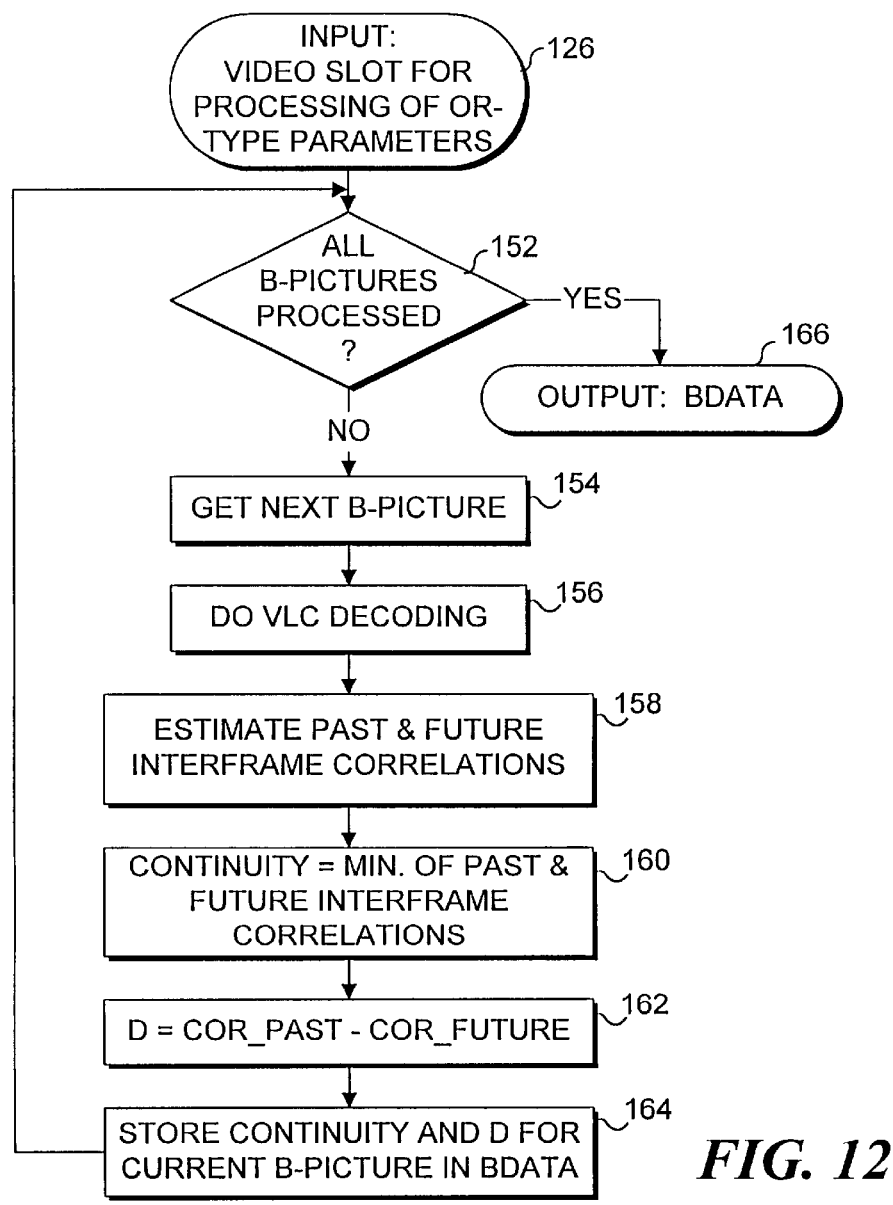
Figure 14:
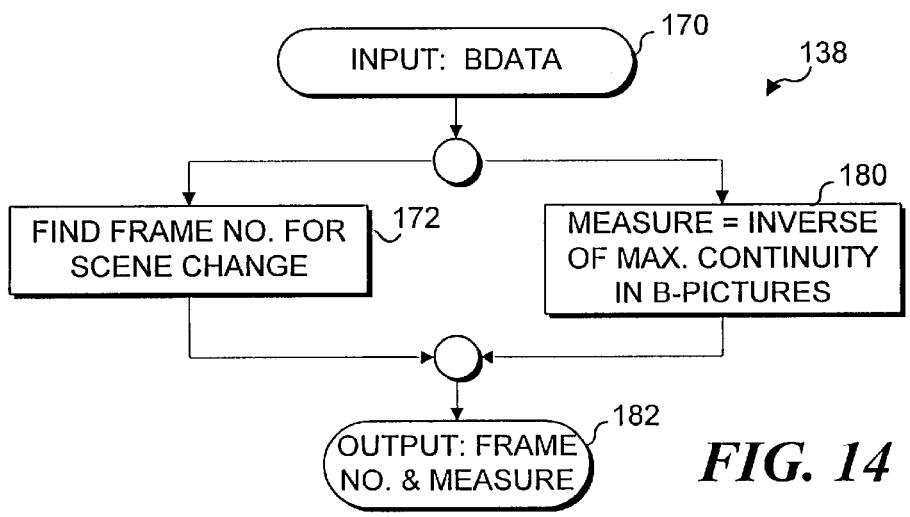
Figure 15:
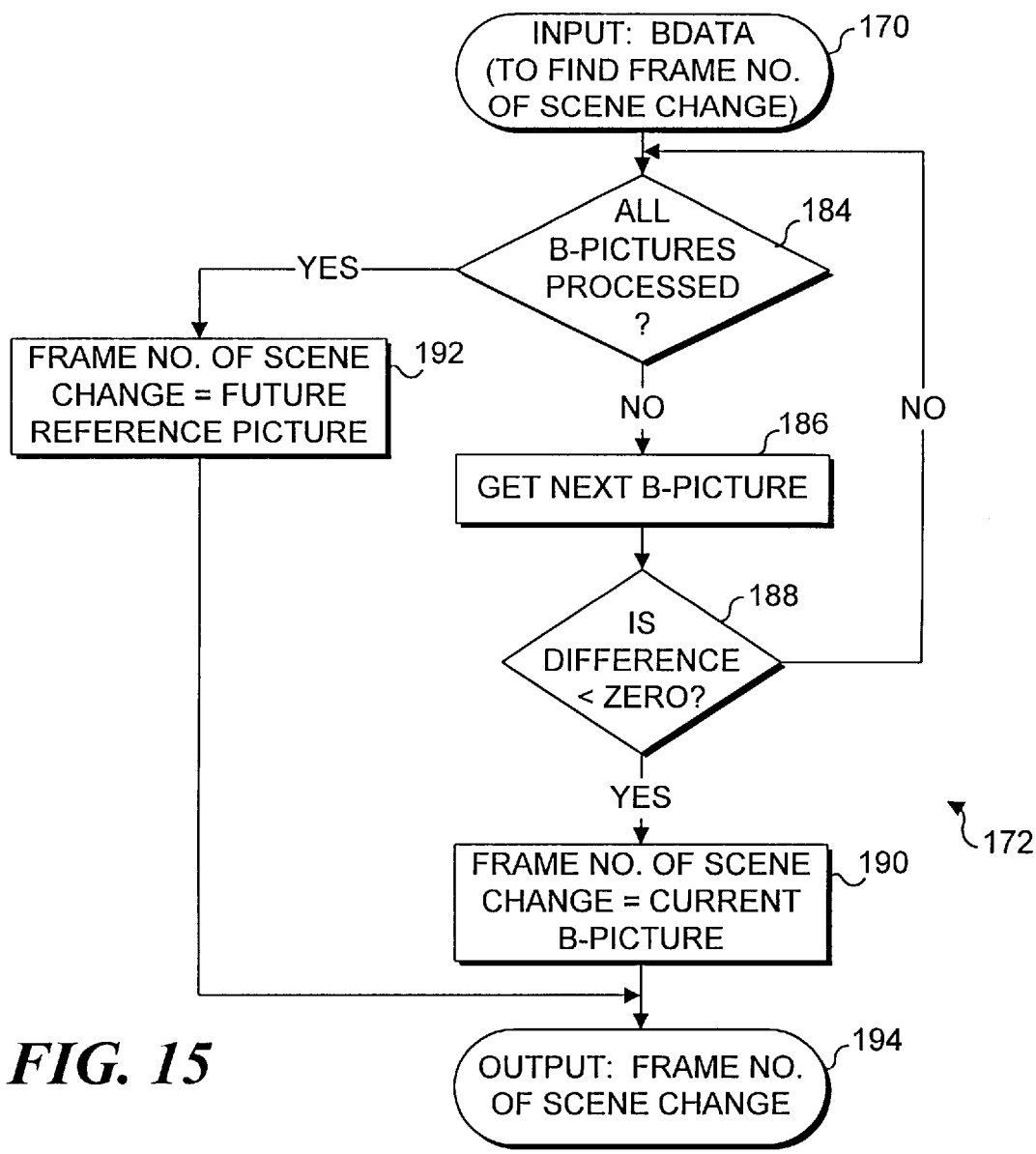
Figure 16:
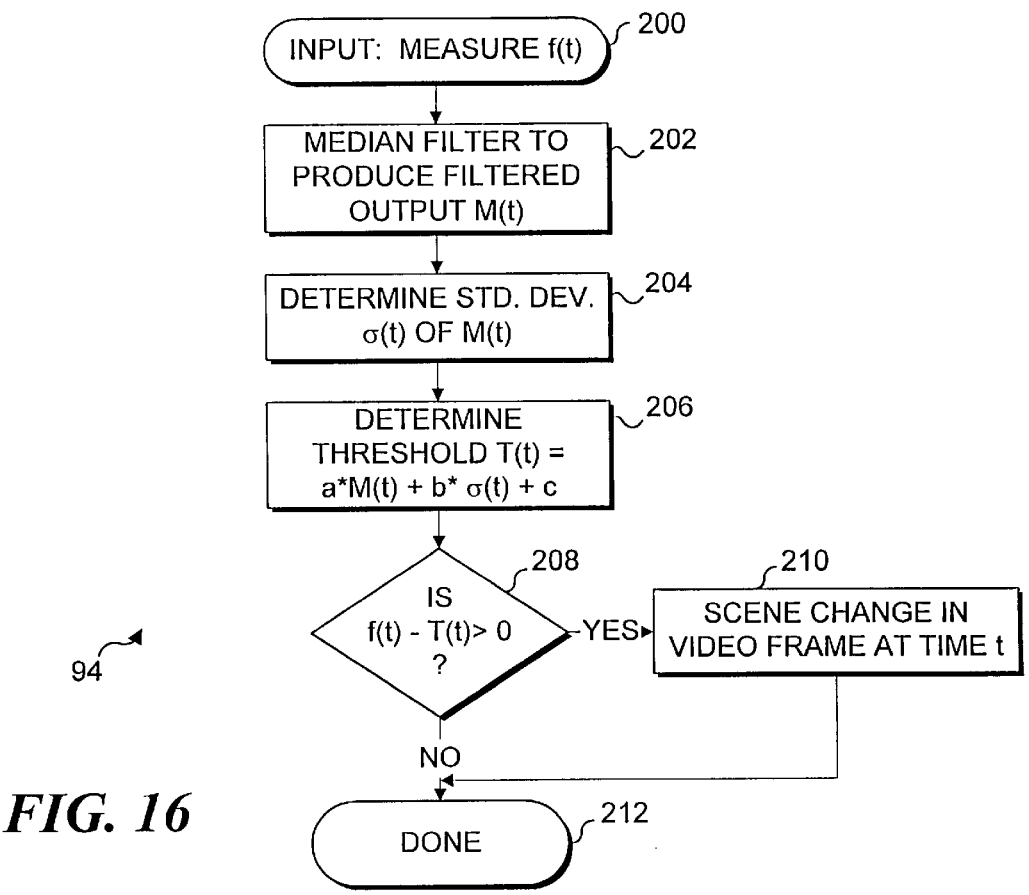
Figure 17:
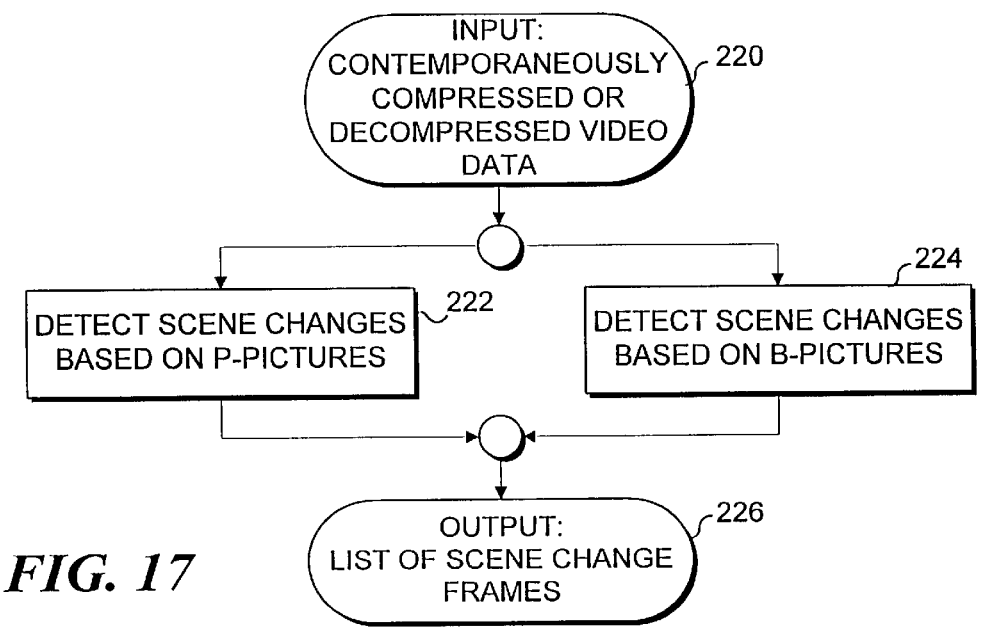
Figure 18:
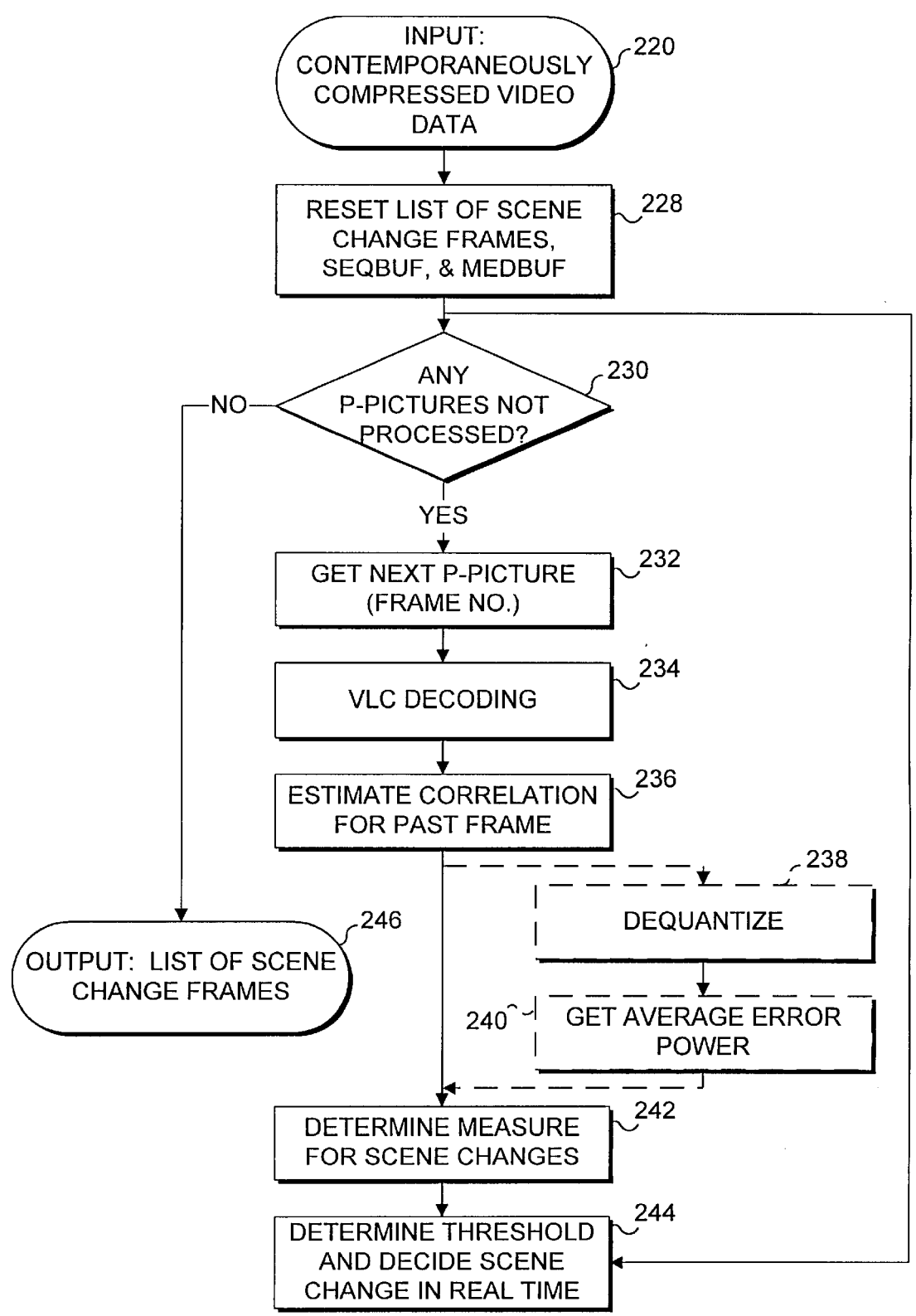
Figure 19:
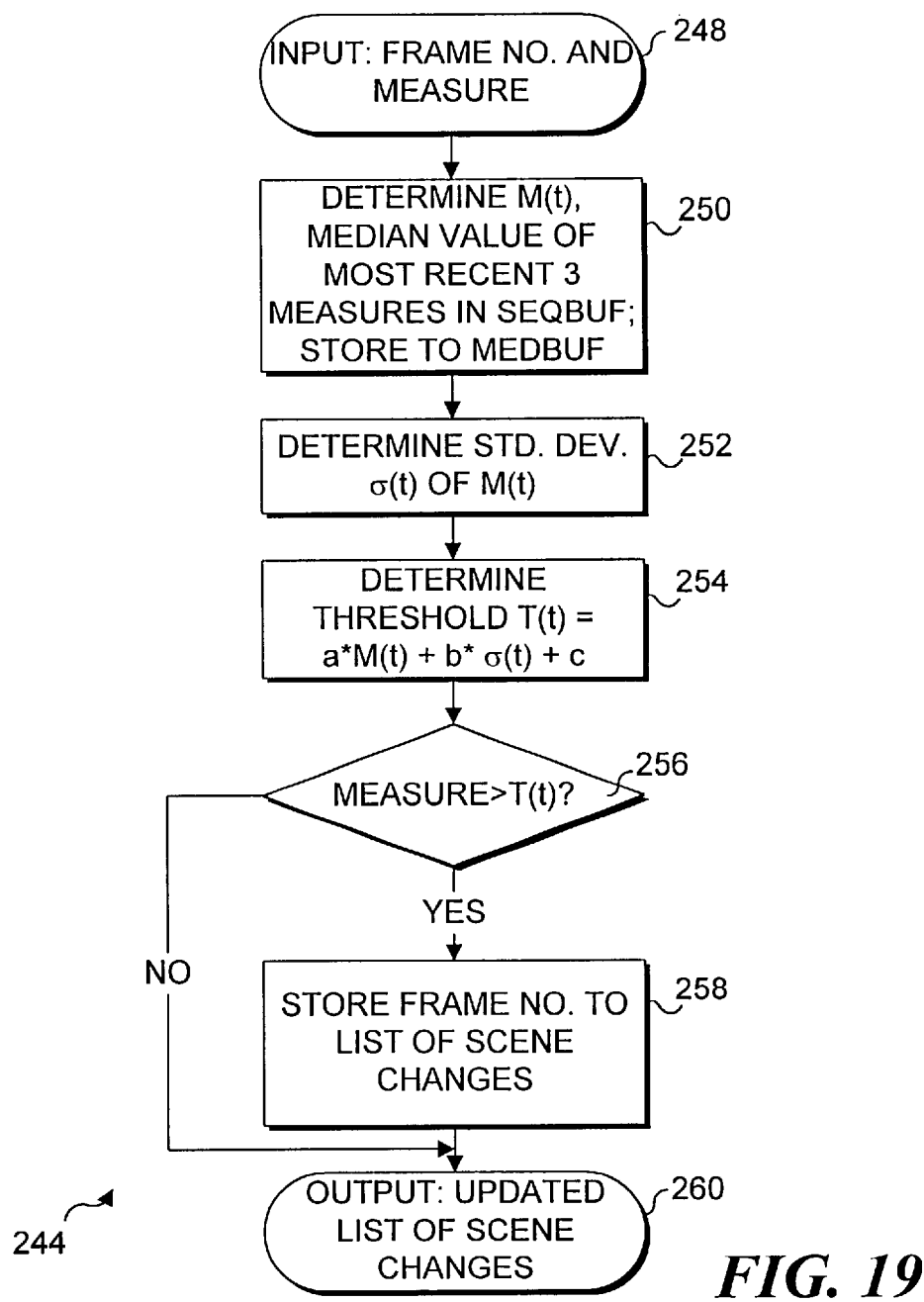
Figure 20:
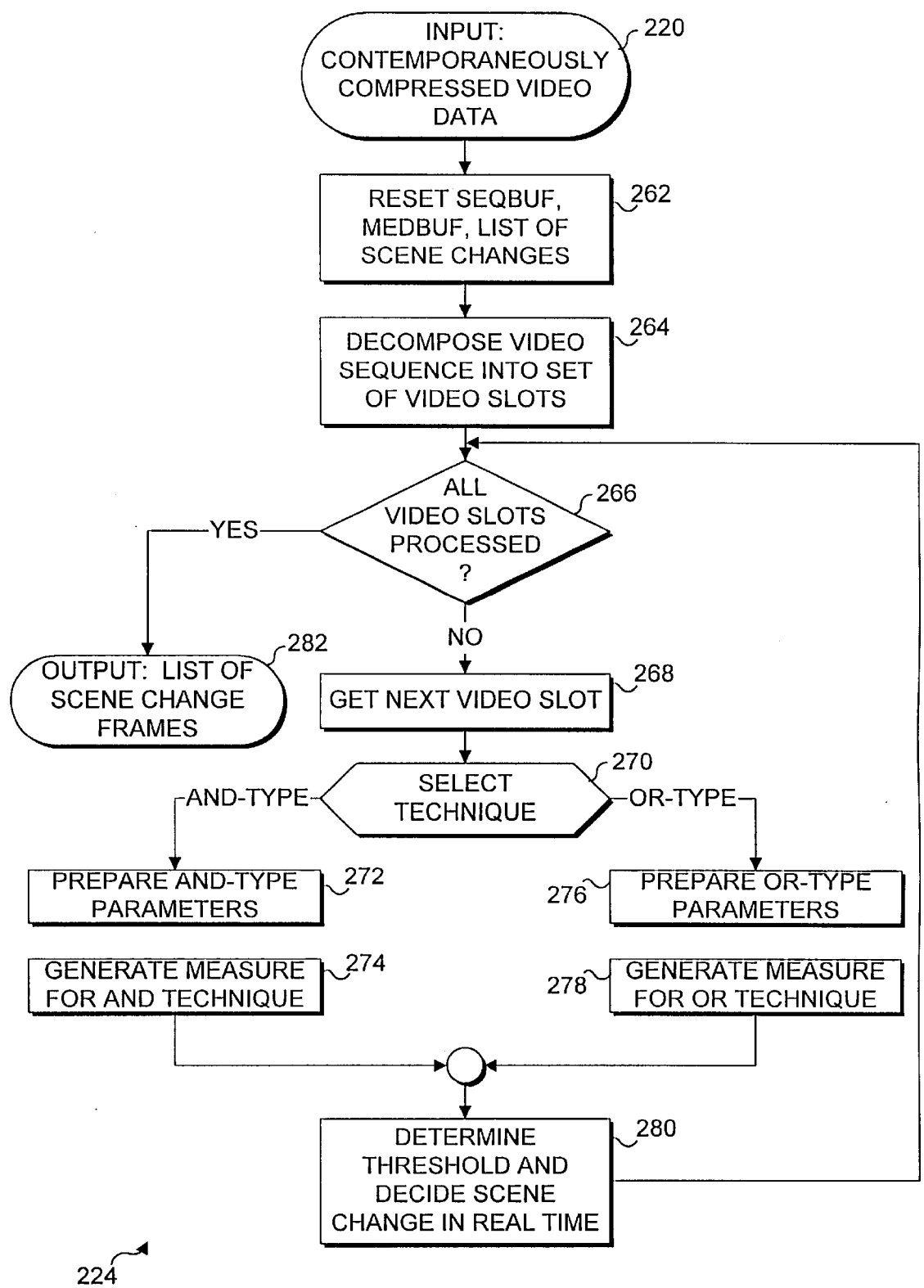
Figure 21:
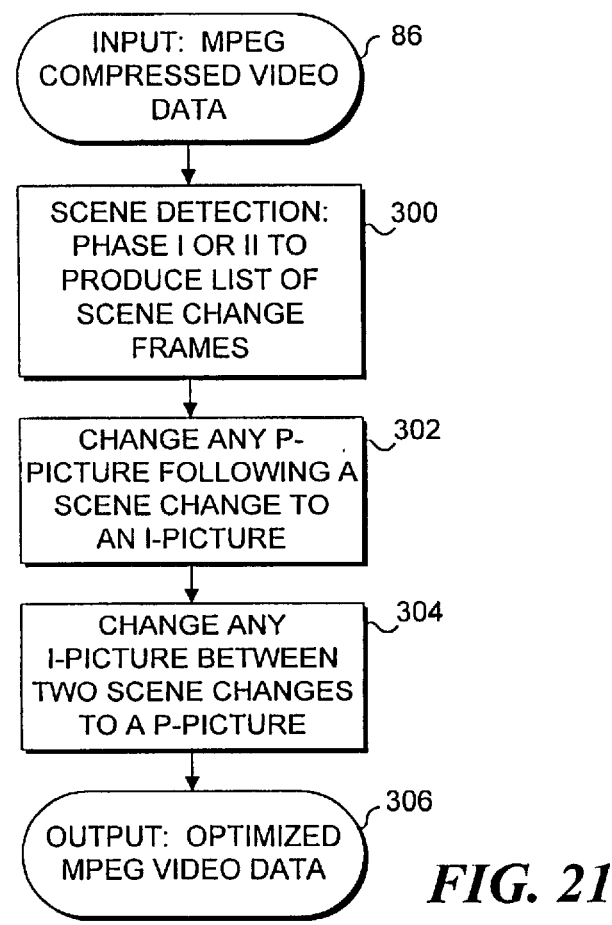
Figure 26:
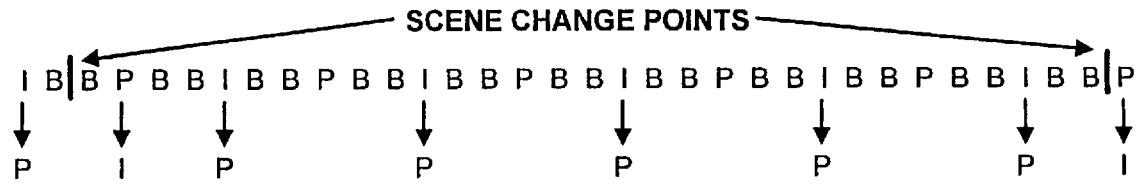
Figure 22:
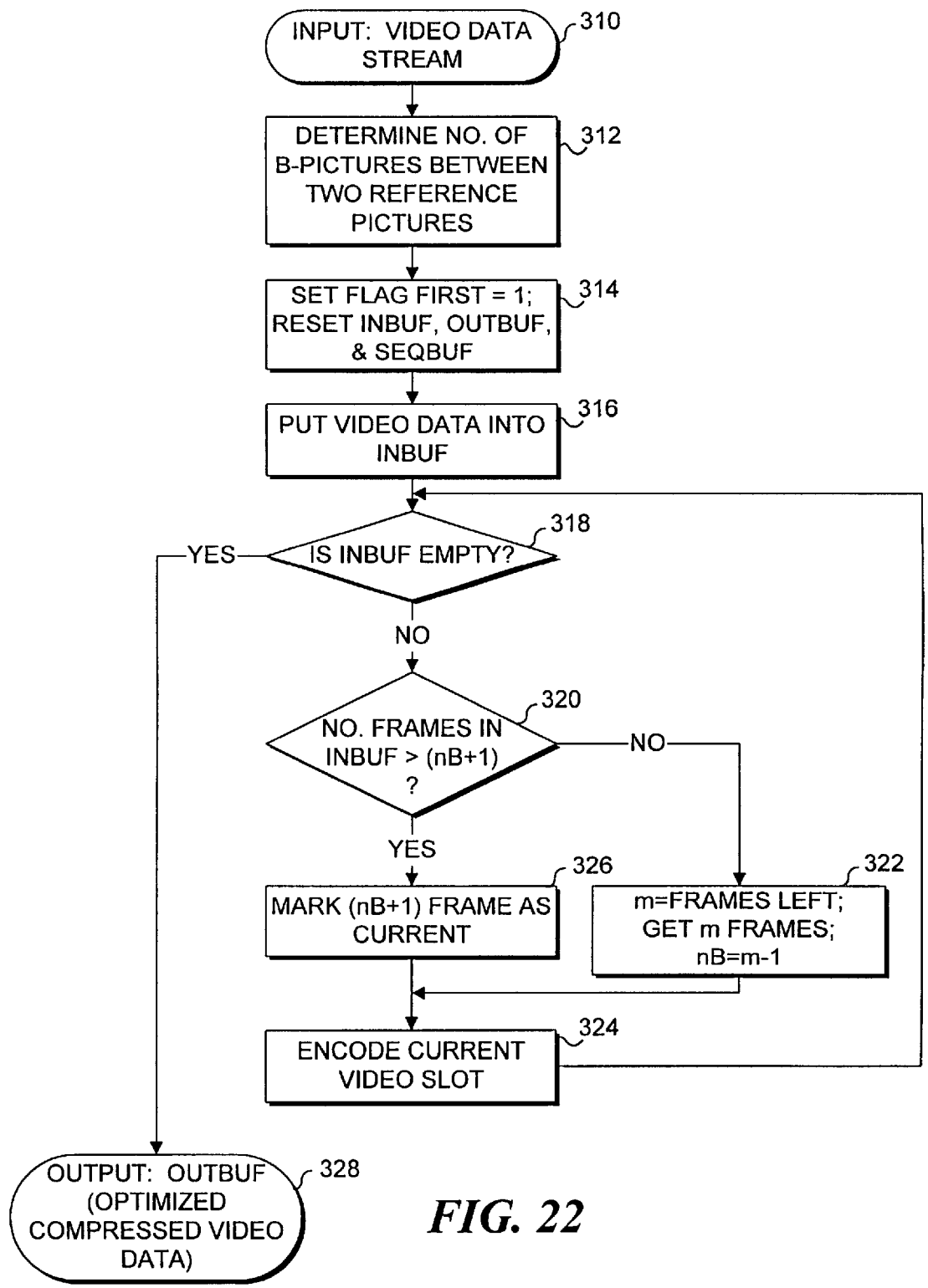
Figure 23:
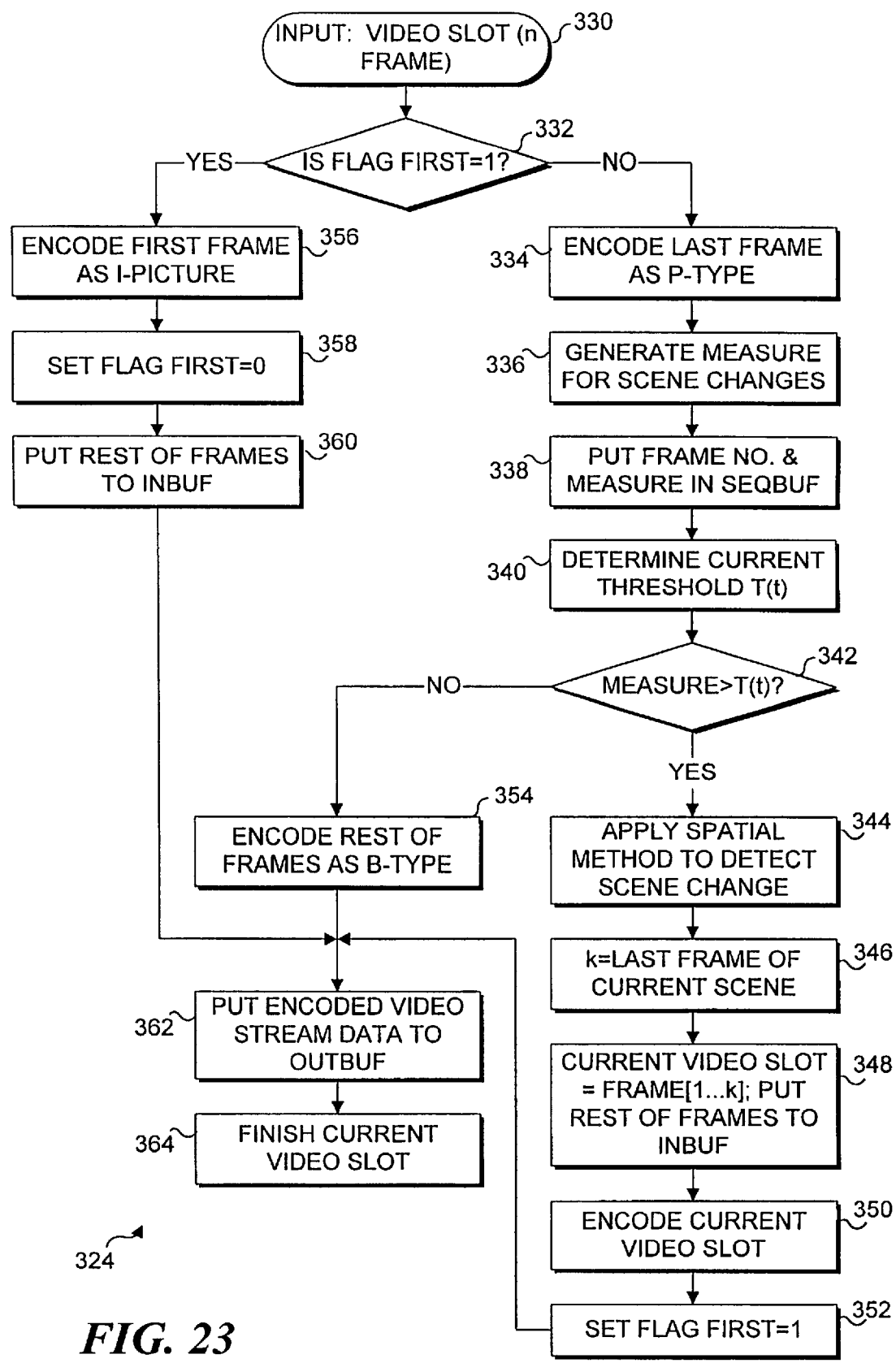
Figure 24:
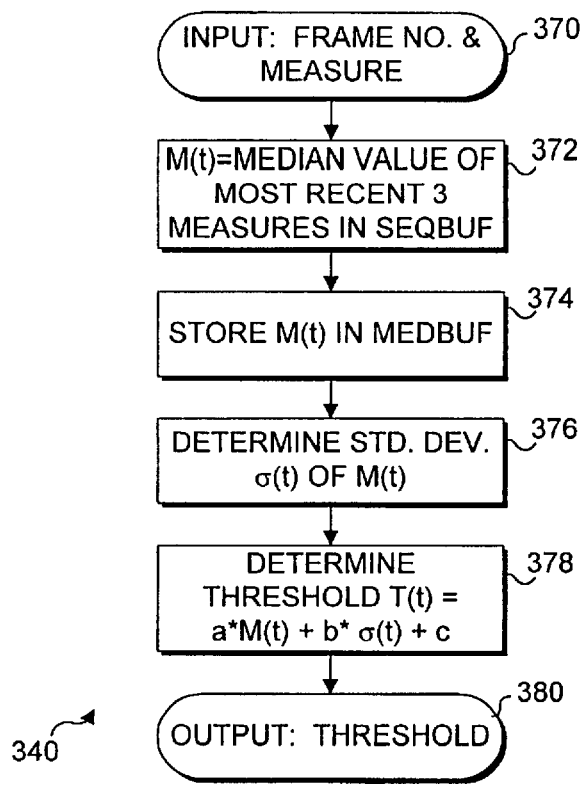
Figure 25:
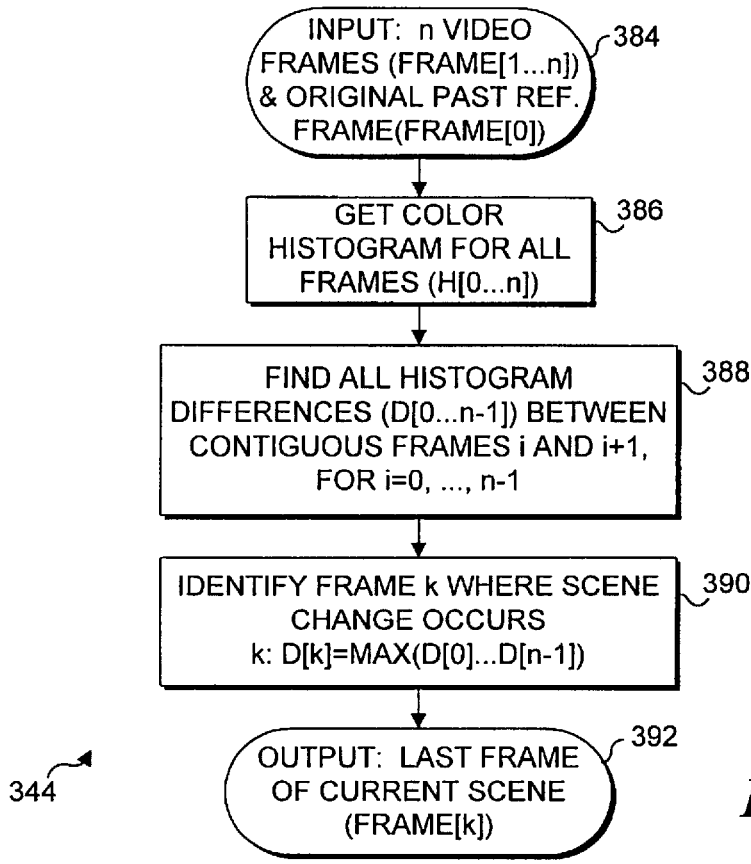
Figure 27:
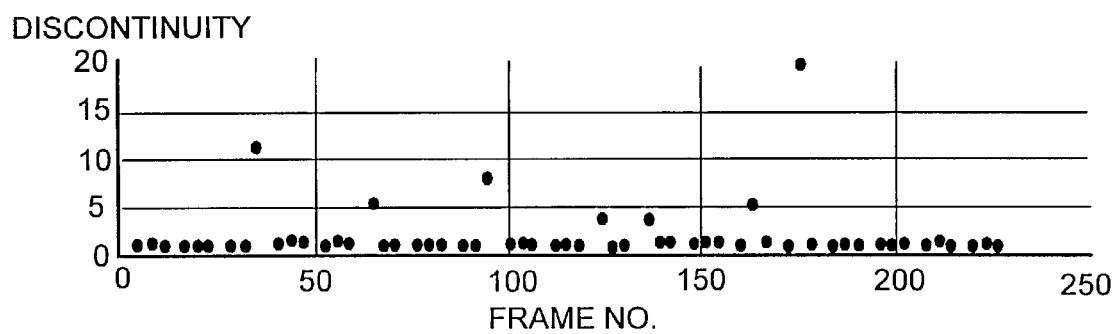
Figure 28:
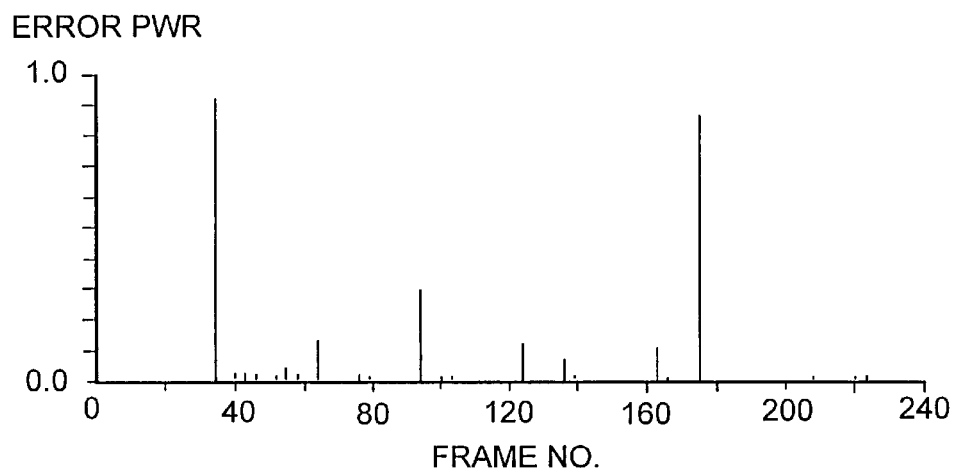
Figure 29:
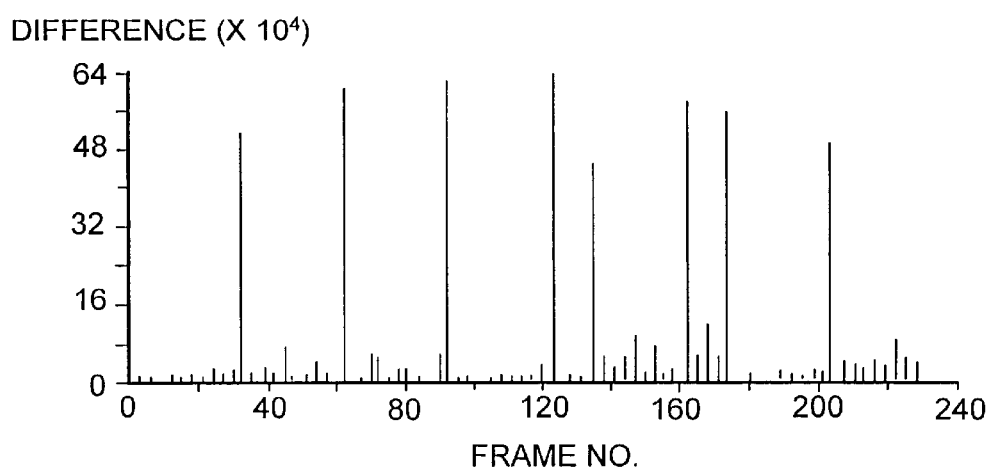
Figure 30:
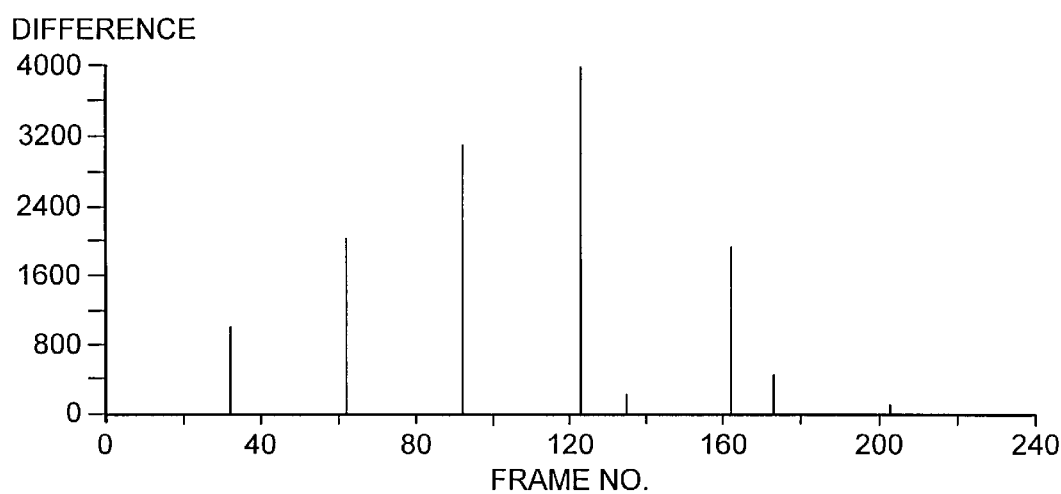
Figure 31:
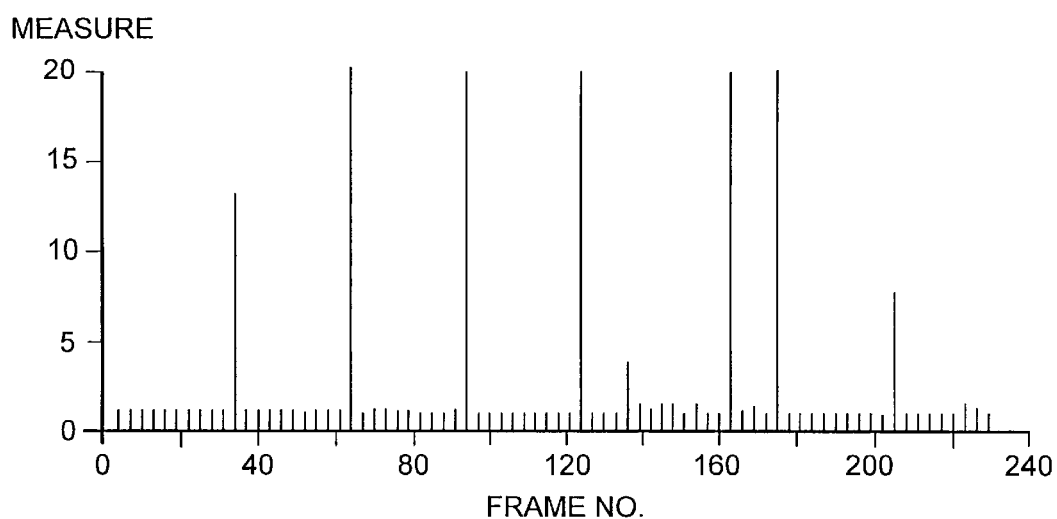
Figure 32:
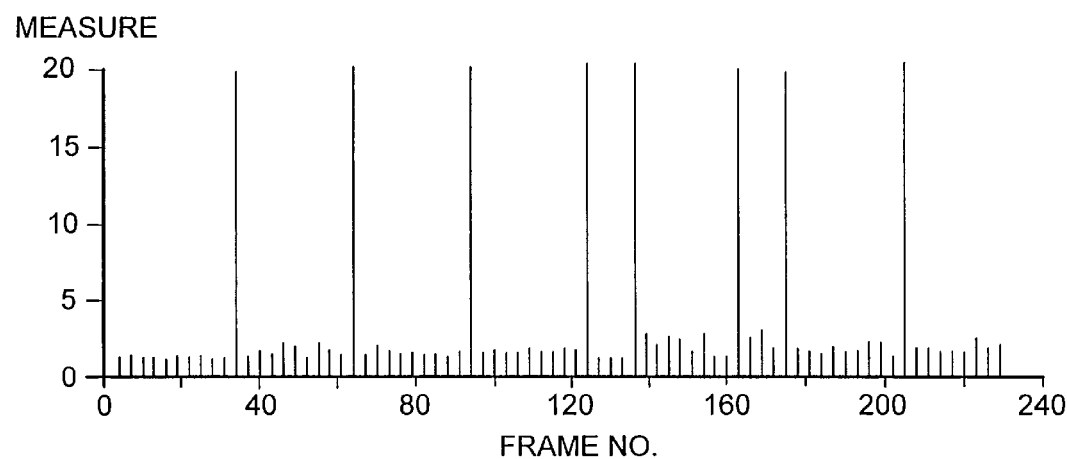
Figure 33:
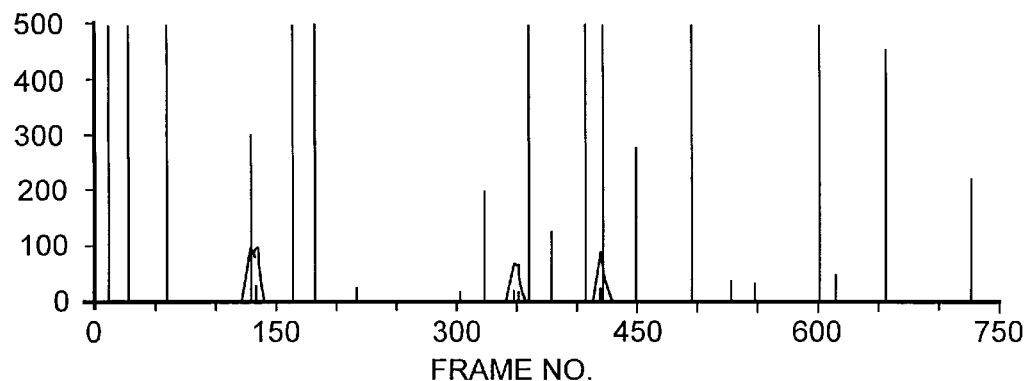
Figure 34:
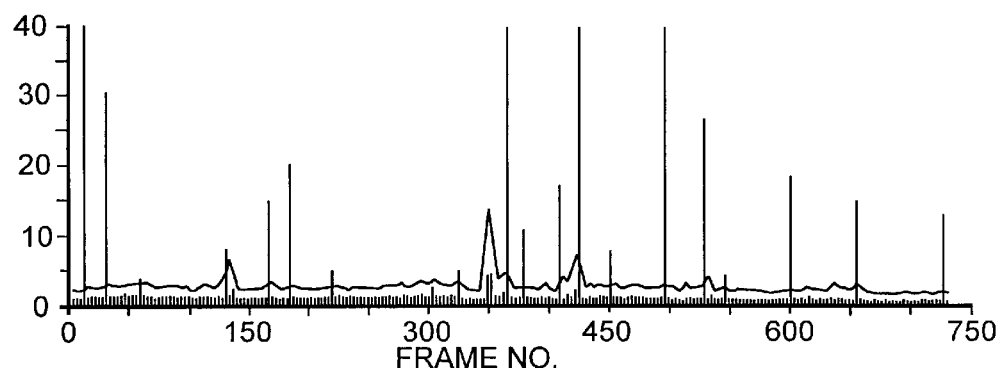
Figure 35:
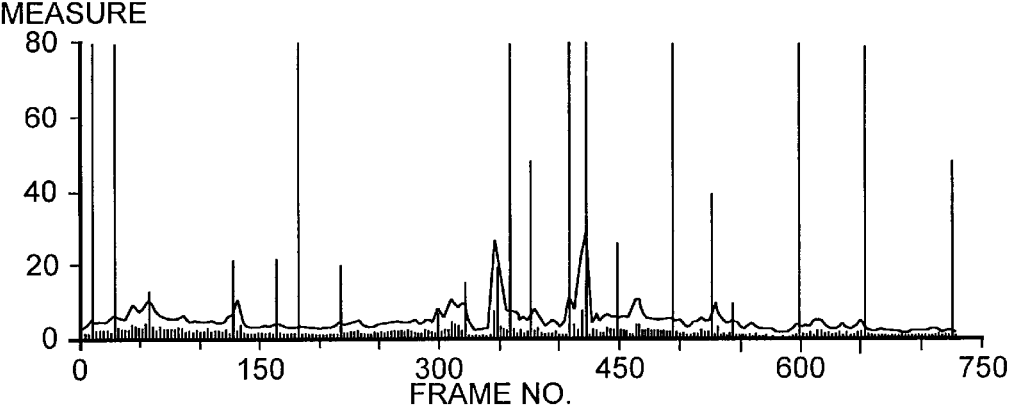

FIGS. 3A, 3B, and 3C (prior art) schematically represent the different types of pictures or video frames used in MPEG compression;

FIG. 4A (prior art) schematically represents a past, current, and future video frame relative to a moving MB within the frames;

FIG. 4B (prior art) schematically illustrates the relationship between a MB, its DCT component blocks and color data, and the relationship of the scan applied in the MPEG compression process;

FIG. 5 (prior art) is a functional block diagram of the MPEG decoding process;

FIG. 6 is a functional block diagram of the components used to scan parameters encoded in the compressed data;

FIG. 7 is a block diagram illustrating the structure of MPEG compressed data;

FIG. 8 is an overview flow chart that broadly indicates the steps for determining scene changes in video data;

FIG. 9A is a flow chart illustrating the logic employed to determine a discontinuity function for all P-pictures;

FIG. 9B is a flow chart illustrating the steps for determining a difference between a current I-picture and a prior reference frame;

FIG. 10 is a flow chart illustrating the logic employed to determine a discontinuity function for video slots;

FIG. 11 is a flow chart showing the steps for determining "AND-Type" parameters as referenced in FIG. 10;

FIG. 12 is a flow chart showing the steps for determining "OR-Type" parameters as referenced in FIG. 10;

FIG. 13 is a flow chart showing the steps for generating a measure for the AND-Type parameters, as referenced in FIG. 10;

FIG. 14 is a flow chart showing the steps for generating a measure for the OR-Type parameters, as referenced in FIG. 10;

FIG. 15 is a flow chart illustrating the preliminary steps employed to identify the scene change frames, as referenced in blocks of FIGS. 13 and 14;

FIG. 16 is a flow chart showing the steps for determining the threshold, for identifying the scene change frames;

FIG. 17 is an overview flow chart of a modified embodiment for identifying scene change frames as video data are compressed;

FIG. 18 is a flow chart showing more details of the block in FIG. 17, which provides for detecting scene changes based on P-pictures;

FIG. 19 is a flow chart showing the logic employed for determining the threshold and identifying scene changes on-the-fly (in real time);

FIG. 20 is a flow chart showing more details of the block in FIG. 17 that provides for detecting scene changes based on B-pictures;

FIG. 21 is an overview flow chart broadly reciting the steps employed to optimize MPEG video;

FIG. 22 is a flow chart showing more details of the procedure to optimize MPEG video;

FIG. 23 is a flow chart illustrating steps used to encode the current video slot, as referenced in FIG. 22;

FIG. 24 is a flow chart showing the steps used to determine the threshold;

FIG. 25 is a flow chart showing the steps implemented to apply a spatial method to detect a scene change;

FIG. 26 schematically illustrates the changes made to a conventional series of video frames to optimize the video data in accord with the present invention;

FIG. 27 is a graph of the discontinuity of each frame of a video, illustrating the peaks that indicate a scene change;

FIG. 28 is a graph of error power versus frame number, used to identify scene changes;

FIG. 29 is a graph of the results of an AND analysis, without weighting, showing the frame by frame differences and the frame numbers to which the difference apply;

FIG. 30 is a graph of the same analysis as in FIG. 29, but with weighting applied;

FIG. 31 is a graph showing the results of an OR analysis (weighted), in terms of the measure relative to the frames of the video data;

FIG. 32 is a graph showing the OR analysis measure determined using the MB inner (dot) product;

FIG. 33 is a graph showing an AND analysis of video data with weighting, relating the difference/number of B-type MBs to the frame number;

FIG. 34 is a graph showing an OR analysis, in terms of a measure and frame number; and FIG. 35 is a graph illustrating the OR analysis measure versus frame number, with MB correlation.

DESCRIPTION OF THE PREFERRED EMBODIMENT

System Hardware

Figure 1:
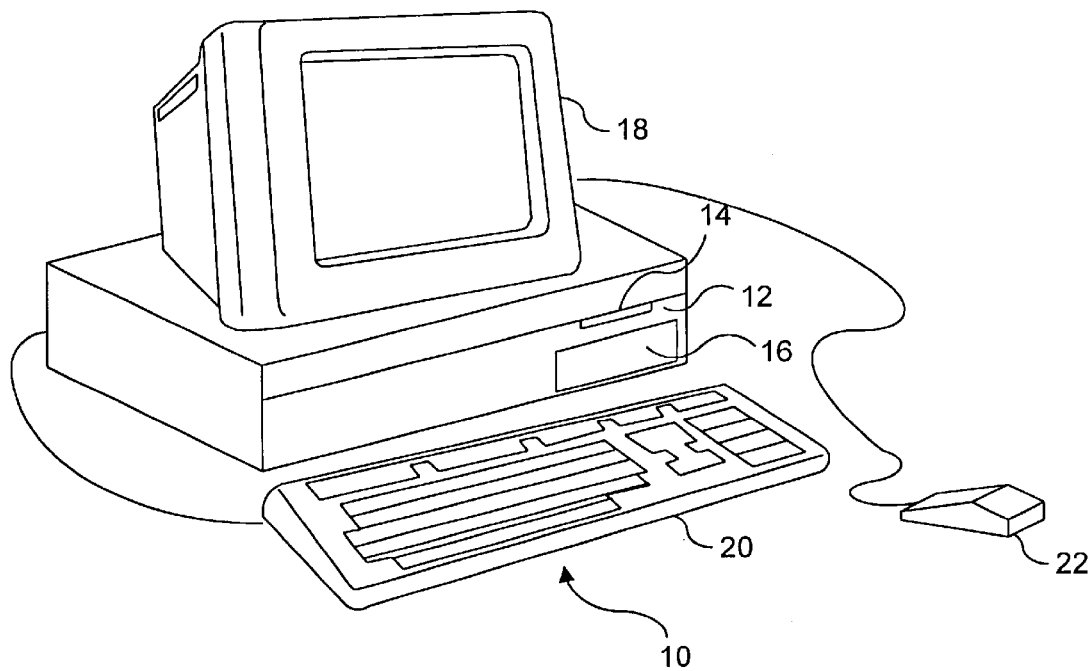
FIG. 1 is an isometric view of a personal computer that is suitable as part of a system for executing the present invention.

The present invention, which is intended to be implemented in a computer system, such as personal computer 10, which is shown in FIG. 1, is used for processing video data that have already been compressed, for example, by applying the MPEG compression technique, or video data that are being compressed, to identify the points in the video data stream at which scene changes occur. Detection of scene changes, as noted above, enables indexing of the video data for locating specific frames. A further aspect of the invention is directed to improving the quality of the compression process, and/or increasing the compression ratio of the compressed video data.

As shown in FIG. 1, personal computer 10, which is suitable for implementing the present invention, is generally conventional in design, including a processor chassis 12 in which are mounted a floppy disk drive 14 and a hard disk drive 16. On processor chassis 12 is disposed a display monitor 18. A keyboard 20 is coupled to the processor chassis, enabling a user to input instructions or data used in connection with the operating system and with applications, such as the present invention, which are executed by personal computer 10. In addition, a mouse 22, or other suitable pointing device, is coupled to processor chassis 12, providing further facility for operator input and selection of options presented visually on display monitor 18.

Figure 2:
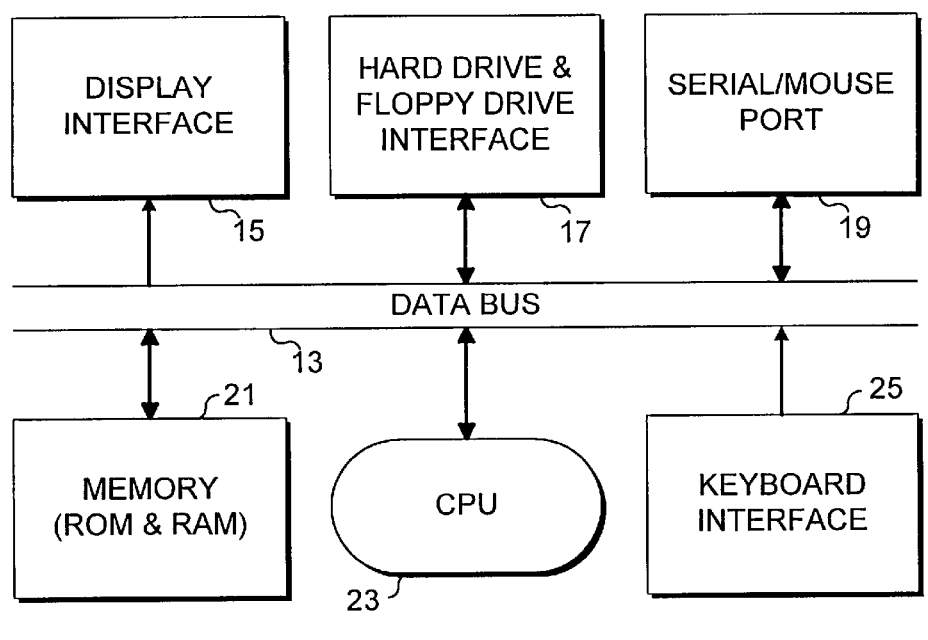
FIG. 2 is a schematic block diagram illustrating internal components of a processor chassis of the personal computer shown in FIG. 1.

The operation and structure of personal computers is well known to those of ordinary skill in the art. However, FIG. 2 is included to display some of the internal components 11, which are used for executing applications on personal computer 10, such as the software instructions implemented to carry out the present invention. Components 11 include a data bus 13, which provides a pathway for internal communication between a central processing unit (CPU) 23 and the other components. A display interface 15 is connected to data bus 13, and is used for generating signals that drive display monitor 18, under the control of CPU 23. A hard drive and floppy drive interface 17 is coupled to data bus 13 to bidirectionally convey data and machine instructions that are either stored on hard drive 16, or on a floppy disk (not shown) inserted in floppy drive 14, or to read data and machine instructions from files stored thereon. A serial/mouse port 19 is also bidirectionally coupled to data bus 13, enabling serial data and/or signals from mouse 22 to be conveyed to data bus 13, for purposes of controlling applications being executed by CPU 23. A keyboard interface 25 is used to couple keyboard 20 to data bus 13, providing a port for input of signals indicative of key presses made by a user for input of instructions and/or data.

Applications executed on personal computer 10 are typically stored in files on hard drive 16 (or on floppy disks inserted into floppy drive 14). These files include machine instructions that are loaded into a memory 21, for execution by CPU 23. Memory 21 includes both read only memory (ROM) and random access memory (RAM). The machine instructions stored in ROM are employed for booting up the personal computer, since this type of memory is nonvolatile. However, the RAM is used for storing the machine instructions executed when an application is run on personal computer 10. Although personal computer 10 is illustrated as a desktop computer, it will be appreciated that the present invention can be run on other types of computers, including workstations, portable computers, and minicomputers. However, the amount of data involved in a typical video sequence will typically require that a relatively large hard drive (capacity of one Gbyte or greater) or other type of nonvolatile storage device be accessible for data read and write operations by the computer. Furthermore, due to the substantial processing load involved, a fast CPU (running at 60 MHz or more) having a math coprocessor will be preferred.

MPEG Compression Standard

As noted above, in the Background of the Invention, the MPEG compression standard is widely accepted for minimizing the size of the data file used to store video (and audio) data. In this standard, six layers are specified to organize every video sequence, including a sequence layer, a group of pictures layer, a picture layer, a slice layer, an MB layer, and a block layer. Further, there are three types of pictures defined in each picture layer, including an I-picture, a P-picture, and a B-picture. (It should be noted that the terms "picture" and "frame" are used interchangeably throughout the following discussion.) The type of picture indicates the relationship of that picture to other pictures in the sequence. For example, the I-picture is independent of other pictures, since none of the data within it relates to any other picture. The P-picture is related to a past reference frame, including either a previous I- or P-picture, and each B-picture is related to a past reference frame and a future reference frame, which may be either a previous and a next I- or P-picture. The relationship between a P- or a B-picture and its corresponding reference frame(s) relates to differences between the picture and its reference frame(s). Since video content does not usually change much during a short period of time, the difference between two frames occurring over a short time span is very small. Thus, it is possible to store only the difference between the current picture and its reference picture so that the amount of stored data is much smaller than the data that would be required to store each frame. The MPEG standard decomposes every picture into MBs and specifies a technique called motion compensation at the MB layer to minimize the difference between the current picture and its reference(s). As a consequence, an MPEG encoder need only perform a motion estimation for each MB in the picture to find the best match MB in the reference frame(s) for the current picture, and then store the motion-compensated motion vector(s) and a residue between two matched MBs.

FIGS. 3A, 3B, and 3C graphically illustrate the relationship between the different types of pictures, including the relationship between P- and B-pictures and their reference frame(s).

In FIG. 4A, the relationship between a current picture 26, a past reference frame 28, and a future reference frame 29 are illustrated in connection with motion vectors that define the motion of an MB along a motion trajectory, which is represented by the dash line in the Figure. In past reference frame 28, $MB_{pc}$ has a motion vector $MV_2$, relative to $MB_p$. $MB_p$ is located within past reference frame 28 at the same position as $MB_c$ within the current frame. Similarly, in future reference frame 29, $MB_f$ is disposed at a position corresponding to that of $MB_c$ in the current picture, and $MB_{fc}$ is disposed at a position corresponding to the movement defined by a motion vector $MV_1$. If these three frames were viewed in sequence, an object appearing in $MB_{pc}$ in past reference frame 28, which is disposed in the lower left corner of the past reference frame, would appear to be moving along the motion trajectory so that in future reference frame 29, the object would appear within $MB_{fc}$, which is disposed within the upper right corner of the frame. It will thus be apparent that $MB_{pc}$, $MB_c$, and $MB_{fc}$ are the best matched MBs for these three frames. It is possible that all other MBs within the past reference frame and the future reference frame will be generally static, so that the past and future reference frames can be related to the current picture frame simply by storing the best matched MBs, the motion vectors, and the residue of the current picture.

Once the type of current picture is determined in a video data sequence, it is decomposed into MBs that are 16×16 pixels in size. For a B-picture, which is the most general type, there are five possible types of MBs, including an intracoded MB, a forward-predicted MB, a backward-predicted MB, a bidirectional-predicted MB (or average MB), and a skipped MB. Each skipped MB follows the coding method of the previous MB that was encoded. Further, for the skipped MB, it is assumed that motion vectors are the same as in a previous MB, and that the difference of the current skipped MB and a predictor for the current skipped MB is negligible. Consequently, nothing is encoded for a skipped MB.

Since P-pictures only refer to a past reference frame, only intra-coded MBs and forward-predicted MBs, or skipped MBs are possible in P-pictures. A forward-predicted motion vector, $MV_1$, is assumed to be zero for skipped MBs and P-pictures. No motion between matched MBs in a past frame and a current frame implies that $MB_p$ is the predictor of the current MB, which is identified as $MB_c$, in FIG. 4A. For I-pictures, which do not use any reference frames, the intensity of the three different color components for each MB are directly encoded. Differences between matched MBs in the current picture and reference frame(s) and any motion vector comprise coded information that is included within a difference matrix corresponding to each MB of a current frame. The difference matrix is further coded by applying a discrete cosine transform (DCT), as indicated in FIG. 4B. Every 16×16 pixel residual MB is first decomposed into six 8×8 pixel blocks, and the DCT is applied to each of these smaller blocks. Since the DCT decorrelates the input matrix into a few non-zero spectral components, corresponding to the color components of the MB, most of the coefficients of the DCT blocks are zero or substantially zero. Then, all of the spectral components in the DCT domain are quantized based on a quantization matrix. By selecting a different quantization scale, different compression ratios can be achieved. Finally, a variable length coding (VLC) scheme is applied to the quantized DCT components to compress the video data still further. The output of the MPEG encoding process comprises compressed data that can be transmitted to another place through a network, or stored as a compressed video data file for future use.

FIG. 5 illustrates the functional steps employed in decoding MPEG compressed video data. Starting with an MPEG compressed data stream in a block 30, the MPEG decoder loads data into an input buffer, as indicated in a block 32. Data in the input buffer is then subjected to VLC decoding, as provided in a block 34, and to inverse quantization, as indicated in a block 36. After being dequantized, the data are input to a block 38, for DCT decoding. Motion compensation decoding, which involves use of the motion vector information, is provided in a block 40, and a block 42 provides for reordering the frames. The output of the decoder is applied to a block 44, comprising a plurality of YUV video frames running, for example, at thirty frames per second. A block 46 provides for mixing the frames to obtain a composite color image, which is produced in the form of a binary signal that is input to a block 48, for digital to analog conversion. Finally, as indicated in a block 50, an analog video signal is output for use in driving a video display, such as an NSTC monitor.

MPEG compressed video data can be decoded very quickly, compared to the time required for encoding video data into the MPEG compressed format, since all of the coding parameters, such as motion vectors for motion compensation and quantization matrices are provided in the MPEG compressed video data and need not be calculated. Further details of the encoding and decoding process, which are only collaterally related to the present invention need not be further discussed here; the MPEG compression/decompression procedure is fully explained in International Standard Office (ISO) Specification, CD11172-2.

FIG. 7 illustrates the types of blocks and general layout of MPEG compressed video data. At the highest level in a block 70 is a sequence-header, which includes information identifying the MPEG compressed video data stream. Next, a block 72a includes a header for a first group of pictures. Within block 72a are included a picture-header for a first picture, as indicated in a block 74a. The first picture has a block 76a, comprising a slice-header for the first slice within the picture. Block 76a is further broken down into a MB header, a first MB-header being indicated in a block 78a. The MB header includes information identifying the type of MB, and six DCT blocks, as indicated in a block 80a. The first slice includes additional MBs 2, as indicated in a block 78b through n, as indicated in a block 78n. Further, each picture header block includes m slices, as suggested by block 76b and 76m. Similarly, the first group of pictures includes l pictures, as indicated by a block 74b through 74l. Further, p groups of pictures are included within the sequence, as indicated by block 72b through 72p.

Detection of Scene Changes

In accord with the present invention, scene changes within video data can be identified by processing MPEG video data, for example, when decoding the compressed data, or alternatively, when video data are being compressed in accordance with the MPEG video standard. A number of parameters that are involved in detecting scene changes within the video data are available at different points within the MPEG compression/decompression process. Some of these parameters are optional, and some parameters are only used in certain embodiments of the present invention for identifying scene changes. FIG. 6 illustrates the points within the MPEG decoding process at which the parameters used for identifying scene changes are available, or may be derived. Specifically, a block 52 indicates that the output from block 36 in which the VLC decoding occurs comprises frame correlation values, motion vectors, identification of picture type, and an indication of the types of MBs within each picture. Further, a block 54 coupled to the output from block 36, which provides for dequantizing the signal produced by VLC decoding, indicates that the dequantized signal can be used to determine the DCT components, an error power value, and an average error power value. The steps involved in determining the parameters in blocks 52 and 54 are described below.

The process of identifying scene changes is dependent upon the different types of MBs within each frame. Accordingly, in the following discussion, for a picture i, a symbol $I^i$ is used to represent the set of intra-coded MBs. A symbol $F^i$ is used to represent the set of forward-predicted MBs; $B^i$ represents the set of backward-predicted MBs; $A^i$ represents the set of bidirectional-predicted MBs; and $J^i$ represents the set of all MBs. Further, the number of all intra-coded MBs is represented by $N(I^i)$; the number of all forward-predicted MBs is represented by $N(F^i)$; the number of all backward-predicted MBs is represented by $N(B^i)$; the number of all bidirectional-predicted MBs is represented by $N(A^i)$; and the number of all types of MBs is represented by $N(J^i)$.

When a scene change occurs, the visual appearance of a last frame of one scene is typically very different from that of a first frame of the next scene. In other words, there is a discontinuity between successive video frames before and after the scene change. The present invention uses information stored in the header of every MB and the DCT spectral components provided in MPEG compressed video data to detect scene changes. Since these parameters are available in the MPEG compressed video data, it is unnecessary to separately determine the DCT parameters or reconstruct the motion-compensated MBs. The motion parameters have generally been roughly estimated and stored as part of the MPEG format.

There are two sets of attributes that can be used to identify the temporal discontinuity in MPEG compressed video that occurs at a scene change. These parameters are error power and interframe correlation. At a scene change, the error power between video frames on each side of the scene change becomes quite large, and the interframe correlation between the two frames becomes very close to zero. Conversely, for two successive frames in the same scene, the error power is generally small, and the interframe correlation relatively great.

Identifying Scene Changes by Analysis of P-Pictures

For both P- and B-pictures, the DCT components in the MPEG compressed video data represent the decomposition of error signals. Thus, the total error power in a MB k is defined as $$E_{MB}(k) = \sum_{i=1}^{6} \sum_{j=1}^{64} M_i^{k^2}(j) \qquad (1)$$

where $M_i^{k^2}(j)$ is the error power of the $j_{th}$ DCT component of the $i_{th}$ block of MB k.

For a P-picture, the only type of MB related to a past reference frame is the forward-predicted MB. The error power of a forward-predicted MB implies the level of difference between the encoded MB and its motion-compensated MB in the past reference frame. It will be apparent that a scene change that occurs between a P-picture and its past reference frame increases the error power of each forward-predicted MB dramatically. In contrast, for B-pictures, there are three types of MBs related to past and future reference frame(s). These three types of MBs include forward-predicted, backward-predicted, and bidirectional-predicted MBs. If a scene change occurs between the B-picture and a past reference frame, it is not possible for a motion-compensated MB to be determined in the past reference frame, since the scene change would cause a break in any motion between the two different scenes. However, motion-compensated MBs can be determined for future reference frames having sufficiently small error power. Consequently, most of the MBs in the B-picture will be backward-predicted MBs. Similarly, if a scene change occurs between a B-picture and its future reference frame, most of the MBs in the B-picture will be forward-predicted MBs. It will be apparent therefore, that the error power of MBs in a B-picture is unable to reveal information usable for determining a scene change. Consequently, error power is only usable in connection with determining scene changes relative to P-pictures and cannot be applied to determining scene changes by analysis of B-pictures.

For a P-picture, the error power of a single MB is insufficient for determining a scene change has occurred. Instead, an average error power for a P-picture k must be computed to provide a measure of how well all forward-predicted MBs match their predictors in P-picture k. The average error power is defined as follows:

$$E_{avg}^p(k) = \frac{\sum_{i=0}^{N(\mathcal{F}^k)} E_{MB}(i)}{N(\mathcal{F}^k)} \qquad (2)$$

where $E_{MB}(i)$ is the error power defined in Equation (1) and $N(F^k)$ is the number of forward-predicted MBs.

Among the encoded parameters within MPEG data for a P- and B-picture is the number of different types of MBs within the picture. This number is useful to find a correlation between the current frame and the past or future reference frames. When video data are encoded in the MPEG compression process, a matched MB can be found in the past and/or future reference frame(s) except for intracoded MBs. The correlation between a current MB and a matched MB in either a past or a future reference frame should be high, unless a scene change has occurred between the current picture and its past or future reference frame.

For a P-picture i, the number of forward-predicted MBs, which is represented by $N(F^i)$, is the total number of MBs in P-picture i having matched MBs in a past reference frame. Accordingly, a ratio of $N(F^i)$ to $N(J^i)$ represents the correlation between P-picture i and its past reference frame, p, as indicated by the following equation.

$$C_p(i, p) = \frac{N(\mathcal{F}^i)}{N(\mathcal{J}^i)} \qquad (3)$$

For a B-picture i, both forward-predicted MBs and bidirectional-predicted MBs are highly correlated with MBs in a past reference frame, while both backward-predicted MBs and bidirectional-predicted MBs are highly correlated to MBs in a future reference frame. Thus, the correlation between a current B-picture i and its past reference frame p can be defined by the following equation.

$$C_b(i, p) = \frac{N(\mathcal{F}^i) + N(\mathcal{A}^i)}{N(\mathcal{J}^i)} \qquad (4)$$

Similarly, a correlation between a B-picture i and its future reference frame $f$ can be defined by the following equation.

$$C_b(i, f) = \frac{N(\mathcal{B}^i) + N(\mathcal{A}^i)}{N(\mathcal{J}^i)} \qquad (5)$$

When a scene change occurs between a P-picture and its past reference frame, the correlation function for the P-picture, as defined by Equation (3), drops to approximately zero. It will be apparent, therefore, that either the reciprocal of Equation 3 or 1−Equation (3) can be used to identify the level of discontinuity, and thus can detect a scene change between the current P-picture and its past reference frame. Furthermore, a scene change between a P-picture and its past reference frame will significantly increase the average error power, as defined by Equation (2). Therefore, with different combinations of Equation (2) and Equation (3), a set of measures, ƒ(t), can be defined that are useful for detecting scene changes between P-pictures and their past reference frames. Two possible combinations of Equation (2) and Equation (3) are defined as follows:

$$f(t)=[A \times E^P_{avg}(k)]^n \times [B \times C_p(i,p)]^{-m}+D \quad (6)$$

$$f(t)=[A \times E^P_{avg}(k)]^n \times \{C \times [1-C_p(i,p)]\}^l+D \quad (7)$$

Either of the above two equations can be used as a measure of discontinuity to identify scene changes between the current P-picture and its past reference picture. In the above equations, the variables n, m, and i represent any positive integers, and A, B, C, and D are any arbitrary constants. Preferably, A, B, and m are all equal to one, D is equal to zero, and n is equal to either zero or one. Given these values for the variables and constants, the preferred technique for determining the measure is given by either of the two following equations.

$$f(t) = \frac{1}{C_p(i, p)} \quad (8)$$

$$f(t) = \frac{E^p_{avg}(k)}{C_p(i, p)} \quad (9)$$

Equation (7) is preferably not used to identify a scene change, because complicated video activity (e.g., many moving objects) in a sequence of frames can also reduce interframe correlation to a value close to zero, even though a scene change has not occurred. The margin for deciding whether a scene change or complicated video activity has caused a reduction in interframe correlation is not very great. However, in Equation (6), inversion of the correlation value obtained from Equation (3) amplifies that value around zero, thereby increasing the decision margin between the two possible causes of a relatively low interframe correlation.

Identifying Scene Changes by Analysis of B-Pictures

For a B-picture, a scene change occurring between a future reference frame and a current reference frame or between a current reference frame and a past reference frame will cause one of the correlation functions for the B-picture defined by Equations (4) and (5) to decrease to about zero, while the other correlation value remains relatively high. A typical video slot will have two or more B-pictures between reference frames that define the beginning and end of the video slot. It will be recalled that either an I-picture or a P-picture can comprise a reference frame for a video slot. Generally, detecting a scene change by analyzing interframe correlation in B-pictures is preferable to the detection of scene changes using P-pictures. Specifically, B-picture analysis techniques for determining scene changes do not have the problem with low interframe correlation caused by complicated video activities occurring in successive frames. Further, when video sequences contain significant motion, temporal distance becomes more crucial. Since B-pictures have a shorter temporal distance between their past and future reference frames, an analysis for detecting scene changes that is based on B-pictures tends to be more reliable than that based on P-pictures for video sequences in which significant motion is found.

Since two or more B-pictures typically are found between two reference frames, a measure that is based on all of the B-pictures between the reference frames is more reliable and robust. The analysis of B-pictures can be made using either "AND" or "OR" logic. In connection with the AND analysis, when all B-pictures occurring between two references imply the existence of a scene change, there is a higher probability that a scene change has occurred between the two references. For the OR analysis, if the correlation associated with even one B-picture between two reference frames implies that no scene change has occurred, it is likely that a scene change has not occurred between the reference frames.

Flow Charts Describing the Steps for Identifying Scene Changes

The following paragraphs describe logical steps employed to select frames in which scene changes occur in MPEG compressed video. In FIG. 8, an overview flow chart illustrates the high-level steps implemented by CPU 23 to identify scene changes. A block 86 indicates that the input to this preferred embodiment is compressed video data in a format that conforms to the specification of the MPEG standard. The data can be in the format specified for either MPEG I or MPEG II, since the difference between these two standards only relates to the specific formatting of the compressed data. Either format can be processed in accord with the present invention.

The techniques used to detect scene changes can be based on either P- or B-pictures in MPEG video, or the techniques for both types of pictures can be used, as is the case in the current preferred embodiment. A block 90 in the flow chart indicates that a discontinuity function is determined for every P-picture. A block 92 provides for determining a discontinuity function using parameters in B-pictures for every video slot in the MPEG video sequence. Discontinuity functions from block 90 and 92 are then used in blocks 94a and 94b, respectively, to identify the scene change frames by applying an adaptive threshold to the results of the discontinuity function.

P-pictures contain parameters related only to a past reference frame. As a result, the P-picture-based analysis can identify scene changes between a P-picture and its past reference frame, but not a scene change between a P-picture and a future reference frame. Thus, P-picture-based techniques cannot be used to determine the scene changes in video slots ending with an I-picture.

Due to this limitation and because it is preferable to provide a more robust determination, a block 96 indicates the scene change results are verified. Scene change frames are primarily determined based on the result from the B-picture analysis. The result from P-picture based techniques is used to verify the result from B-pictures based techniques, producing a list of scene change frames in a block 98. Details of the steps implemented in block 96 are as follows:

1. If the B-picture based technique detects a scene change and the P-picture based technique either detects a scene change or has no answer for the current video slot due to the dead zone condition, the video slot is marked as a scene change slot.

2. If one technique detects a scene change and the other does not, the video slot is marked as an uncertain slot. The user may then decide if this is a scene change slot.

3. If both techniques do not detect a scene change, the video slot is marked a normal slot (not containing a scene change).

Details of the steps involved in determining the discontinuity function for every P-picture (block 90 in FIG. 8) are shown in FIG. 9A. After initializing or resetting a buffer labeled "SeqBuf," which will be used for storing the discontinuity function, as provided in a block 100, a decision block 102 determines if any unprocessed I- or P-picture remains in the video data. If yes, a block 104 provides for loading the next available I- or P-picture into memory. A decision block 105 determines if the picture is a P-type frame. If so, VLC decoding of the next P-picture is implemented, as indicated by a block 106. A block 108 calls for estimating an interframe correlation function, as defined by Equation (3), or its reciprocal, or 1−Equation (3). After block 108, a dash connecting line indicates an option to proceed to a block 110, which provides for dequantizing the video data so that average error power, as defined in Equation (2), can be determined in a block 112. It will be recalled that average error power can be used for determining a scene change relative to a P-picture, but that an analysis based on interframe correlation is better. Preferably, both average error power and interframe correlation can be used.

In a block 114, a measure indicative of the discontinuity between the current P-picture and its past reference frame is determined, and the analyzed result is stored in the buffer "SeqBuf" as noted in a block 116. Thereafter, the logic proceeds back to decision block 102, and the steps discussed above are again executed until no P-pictures remain unprocessed. Once processing of P-pictures is completed, the test in decision block 102 yields a negative result, and the procedure terminates with the output of SeqBuf, which contains the measure and frame number for each of the P-pictures, at a block 118.

If the input picture is an I-type, decision block 105 branches to a decision block 107. Decision block 107 determines if any B-picture exists between the current I-picture and the prior reference frame, which can be either an I- or a P-picture. If so, the B-picture based techniques will be employed to decide if a scene change exists, and the logic with then return to decision block 102. If a B-picture does not between the current I-picture and the reference frame, neither the B- nor the P-picture based techniques can detect a scene change for this video slot. In this case, a block 109 provides for determining whether a scene change has occurred between the current I-picture and the previous reference frame.

Further details of the steps implemented in block 109 are shown in FIG. 9B. In a block 406, three frames are input, including the current I-picture, the previous reference frame, and the previous I-picture. Blocks 408 and 410 respectively indicate that VLC decoding is applied to the current and past I-pictures, and that all DC coefficients for these two frames are dequantized. A block 412 provides for dividing both of these I-pictures into 4×4 subframes. The average DC value is determined for each of the subframes in the current and past I-pictures, in a block 414, using the DC coefficients in every 8×8 DCT block. The 16 average DC values obtained in this manner comprise characteristic vectors, "VectCur" and "VectPast," for the current and past I-pictures, respectively. In a block 416, the difference between VectCur and VectPast is determined, and in a block 418, the difference is used to determine the distance between the two vectors. A decision block 420 determines if the distance is greater than a predetermined threshold. If not, the logic terminates at a block 436. Otherwise, a decision block 422 checks to determine if the prior I-picture is the previous reference frame. If so, the current I-picture is marked as a scene change in a block 424, and the logic terminates at block 436. If not, a block 426 provides for transforming both video frames from the DCT to the spatial domain. Next, a block 428 specifies the step of applying a histogram matching between these two frames to determine a corresponding measure. (Details regarding the use of the histogram measure are discussed below, in connection with Equation (20).) A decision block 430 determines whether the result of the histogram match is greater than a predefined threshold. If so, a block 432 marks the current I-picture as a scene change frame. Following block 432 or if the response to decision block 430 is negative, the logic terminates in block 436.

Further details of the steps implemented in block 92 to estimate the discontinuity function for every video slot (B-picture analysis) are shown in FIG. 10. A block 120 resets or initializes buffer "SeqBuf," which is a temporary data structure for storing the discontinuity function. A block 122 provides for decomposing an MPEG video data sequence into segments of successive video slots. A decision block 124 then determines whether all video slots have been processed. If not, the logic proceeds to a block 126, which loads the next available video slot. Next, a switch block 128 directs the logic path to the left if the AND analysis is selected. In the AND analysis, a block 130 provides for preparing the appropriate parameters, and a block 132 notes that a measure is determined that is indicative of whether a scene change has occurred within the current video slot. On the other hand, if the OR analysis is selected, the logic path moves to the right of switch block 128. Blocks 136 and 138 respectively provide for preparing the parameters for the OR-type analysis and determining the measure indicative of whether a scene change has occurred in the current video slot. Regardless of the type of analysis selected to be applied, the measure, $f(t)$, and its corresponding (current) frame number are stored in SeqBuf, as provided in a block 134. The logic next loops back to decision block 124. When all of the video slots are processed, a block 140 provides for output of SeqBuf, which contains the measure for each frame in the video data.

Details of AND Analysis

Details of the steps involved in block 130, which prepares parameters for the AND analysis are shown in FIG. 11. The input to this process is a video slot, as indicated in block 126. A decision block 142 determines if all B-pictures in the video slot are processed. If not, the logic proceeds with a block 144, to load the next B-picture, followed by a block 146, which provides for performing VLC decoding of the B-picture data. A block 148 indicates that a difference, D, is determined for the current B-picture and is stored in a set of variables called "BData." The difference function, D, for the current B-picture, k, is defined by the following equation.

$$D(k)=N(F^k)-N(B^k) \qquad (10)$$

When a scene change occurs either immediately after a past reference frame, or immediately before a future reference frame of a B-picture, the B-picture can still relate itself to the other reference frame. Instead of producing a large error power, a scene change occurring between a B-picture and one of its reference frames will cause the B-picture to show a much stronger preference to one reference frame over the other. The difference between correlations for the two reference frames, as defined in Equations (4) and (5), thus becomes significant when a scene change occurs. The value of the difference function D determined by Equation (10) is therefore a good indicator of a scene change.

After the difference function is determined in block 148, the logic returns to decision block 142, and the whole process repeats, until no unprocessed B-pictures remain. A positive response to decision block 142 leads to a block 150, in which the BData are output.

FIG. 13 illustrates the steps in block 132 of FIG. 10 for generating a measure in an AND analysis of the current video slot, based upon the BData input. A block 174 provides for determining the product of the difference functions for all B-pictures, as indicated in the following equation.

$$f(t)=|D_1|\times|D_2|\ldots\times|D_n| \qquad (11)$$

This product is used as the measure of discontinuity in the video slot. Justification for use of this value is as follows. The two correlation functions given in Equations (4) and (5) for a given B-picture depend upon the motion occurring in the scene at that point and upon the temporal distance between the B-picture and its two reference frames. A single large value for D(k) can be obtained for many reasons. However, when there is a scene change in a video slot, all of the B-pictures in the video slot show large values of absolute difference |D|. Thus, the product of |D| for every B-picture in the video slot can be used as the measure, $f(t)$, for detecting a scene change in the video slot.

The measure determined in accord with Equation (11) inherits a bias from temporal distance. For example, in a video sequence with significant motion, which includes P-pictures and B-pictures in the sequence: $P_1 B_1 B_2 P_2$, the B-picture $B_1$ will have a higher correlation to the P-picture $P_1$ than to $P_2$, since it is temporally closer to $P_1$. Similarly, the B-picture $B_2$ will show a higher correlation to $P_2$. This bias causes the value of the measure of a B-picture to be vulnerable to the level of motion occurring in the video slot. To minimize this bias effect, the inverse of the number of bidirectional MBs is selected as a weighting factor, yielding the following equation for a weighted difference, $WD_{avg}(k)$.

$$WD_{avg}(k) = \frac{D(k)}{N(A^k)} \qquad (12)$$

where $N(A^k)$ is the number of bidirectional-predicted MBs in the B-picture, k. Among the different types of MBs that may occur in a B-picture, only bidirectional-predicted MBs have highly correlated MBs in both past and future reference frames. The greater the number of bidirectional-predicted MBs that occur, the lower the possibility of a scene change. In addition, this number is the crucial parameter in the two correlations defined by Equations (4) and (5). The value $WD_{avg}(k)$ that is returned by Equation (12) is thus preferably used for the difference function in block 148 of FIG. 11.

In FIG. 13, a block 172 indicates that a scene change frame is to be found. The location of a scene change within a video slot can be found by scanning the values of D(k) for each B-picture, k, in the video slot, from beginning to end. A scene change is found where the value of D(k) for the B-picture k changes from positive to negative. The reason for the change in sign of the difference function is that a scene change alters the preference from the past reference frame to the future reference frame where a scene change occurs between the past reference frame and the current B-picture. Therefore, the difference for a B-picture is changed from positive to negative at that B-picture.

FIG. 15 summarizes the above steps. In a block 170, the BData are input to find the frame number of a scene change. A decision block 184 determines if all of the B-pictures have been processed and if not, proceeds to a block 186, which gets the next B-picture. In a decision block 188, the logic determines if the difference function for the current B-picture is less than zero, and if not loops back to decision block 184. An affirmative response to decision block 188, leads to a block 190, which sets the frame number of the scene change to that of the current B-picture. Once all of the B-pictures are processed, a block 192 sets the frame number of a future reference picture as the frame in which a scene change may possibly occur. The output of the procedure in a block 194 is the frame number of a scene change.

Details of the OR Analysis

There are two approaches in the OR analysis that can be used to determine a value for the measure indicative of a scene change. The first approach is based upon the number of MBs in a B-picture. The basic concept behind the OR-type analysis is that if any B-picture shows strong correlation to both its past and future reference frames, the probability of a scene change between these two reference frames will be very low. Extended from this concept, it can further be concluded that the smaller correlation of the two correlation functions defined in Equations (4) and (5) for a B-picture is critical. This smaller correlation can be defined as the degree of continuity of a B-picture i, as given below.

$$Continuity(i)=min(C_b(i,p), C_b(i,f)) \qquad (13)$$

where i is the current B-picture, and p and f symbolize the past and future reference frames, respectively. $C_b(i,p)$ and $C_b(i,)$ are the correlation functions defined in Equations (4) and (5), respectively. The maximum Continuity of each B-picture in a video slot indicates the degree of continuity of the video slot. The inverse of the Continuity can indicate the likelihood of a scene change occurring in a video slot. Hence, a possible measure for the scene change in a video slot $\alpha$ is defined by the following equation.

$$f(t) = M(\alpha) = \frac{1}{\max(\{Continuity(B_k)|B_k \in B(\alpha)\})} \qquad (14)$$

$B(\alpha)$ is the set of all B-pictures in the video slot $\alpha$ and $B_k$ is the $k_{th}$ B-picture. In Equation (13), all of the parameters are based on the number of different types of MBs related to both past and future reference frames. Since the number of different types of MBs is readily available in the compressed video data, this measure can be evaluated quickly.

The details of the steps that implement Equation (14) are shown in FIGS. 12 and 14. FIG. 12 illustrates the details of the steps encompassed by block 136 in FIG. 10. As shown in FIG. 12, a decision block 152 determines if all B-pictures have been processed. If not, a block 154 indicates that the next B-picture is obtained for processing. In a block 156, VLC decoding is applied to the current B-picture. After the VLC decoding, a block 158 calls for estimating interframe correlation functions between the current B-picture and its past and future reference frames, as defined in Equations (4) and (5), respectively. A block 160 then calls for determining the Continuity corresponding to the current B-picture, as defined by Equation (13). The difference between the past and future correlation functions is determined in a block 162 and stored in BData in a block 164. The logic repeats, returning to decision block 152, until all B-pictures are processed, and then proceeds to a block 166, in which BData are output.

Next, the steps shown in FIG. 14 are executed. Using the BData as input, a block 180 determines the measure of scene changes using Equation (14). In a parallel action, a block 172 find the possible scene change frame for the current video slot. The output of this process is thus a frame number and a measure.

Instead of using Equations (4) and (5) for determining the interframe correlations between the current B-picture and its past and future reference frames, respectively, an alternative approach can be used that is based on motion vectors. Specifically, this alternative technique is based upon the fact that the sum of all inner products of two motion vectors corresponding to any two contiguous MBs explicitly indicates the correlation, based upon the detailed motion in the picture. An example will help to clarify this point.

For a MB k, there are two sets of parameters, including its spatial location $(x^k, y^k)$ and its motion vector $mv^k$, which can be represented by the components $(mv^k_x, mv^k_y)$. The inner product of the motion vectors of two contiguous MBs is indicative of the Continuity of the motion between them. Accordingly, the correlation between any two MBs k and l is defined by the following equation.

$$cor(k, l) = \begin{cases} \dfrac{mv^k \cdot mv^l}{|mv^k| \cdot |mv^l|} & 0 \leq x^k x^l \leq 1 \wedge 0 \leq \\ & y^k y^l \leq 1 \wedge k \neq 1 \\ 0 & \text{otherwise} \end{cases} \quad (15)$$

Equation (15) implies that all eight MBs surrounding the MB of interest are related to the central MB. The correlation between the current B-picture i and it past reference frame p is the sum of all cor(k,l), where k and l∈$F^i \cup A^i$. Based upon this approach, the correlation relative to the past reference frame, $C_b(i, p)$, is defined by the following equation.

$$C_b(i, p) = \frac{\sum_{k,l \in (\mathcal{F}^i \cup \mathcal{B}^i)} cor(k, l)}{N(\mathcal{F}^i)} \quad (16)$$

Similarly, the correlation of a B-picture to its future reference, $C_b(i, f)$ is defined by the following equation.

$$C_b(i, f) = \frac{\sum_{k,l \in (\mathcal{F}^i \cup A^i)} cor(k, l)}{N(\mathcal{F}^i)} \quad (17)$$

Equations 16 and 17 are preferably used to determine the past and future interframe correlations, respectively, in block 158 of FIG. 12, instead of Equations (4) and (5).

The details of the steps for determining the threshold function are given in FIG. 16. The input to this procedure, as indicated in a block 200, is the measure $f(t)$, which is determined as described above. In a block 202, a median filter (implemented in software) is applied to produce a filtered output value, M(t), which is defined by the following equation.

$$M(t) = MED[f(t-1), f(t), f(t+1)] \quad (18)$$

where $f(-1)=f(0)$, and $f(n+1)=f(n)$. The filtered output M(t) will not include any of the significant peaks that were in $f(t)$, but will retain most of the background signal. This output signal thus indicates virtually all video activities except scene changes. A block 204 provides for estimating the standard deviation function σ(t) for every M(t). A block 206 calls for calculating a final threshold function T(t) based on the following equation.

$$T(t) = a^* m(t) + b^* \rho(t) + c \quad (19)$$

where, in the preferred embodiment, b is set equal to 3 to ensure a high confidence level, a is set equal to 4 to provide a signal to noise ratio (SNR) of 12 dB for a weighted analysis (or for a 6 dB SNR, a value of 2 is used for a). The value of c is set to zero, but can be adjusted to further optimize the scene change detection process.

In a decision block 208, the measure function $f(t)$ is compared with the threshold function T(t). If $f(t)$ is greater than T(t), then as noted in a block 210, a scene change has occurred in the video frame at time t. Otherwise, the procedure finishes in a block 212.

Determining Scene Changes When Compressing the Video Data

As implied by a block 220 of FIG. 17, scene changes can be determined during the contemporaneous compression (or decompression) of video data. The advantage of determining the scene changes at this time, rather than independently of the compression/decompression process is that all of the parameters needed for identifying the scene change frames are then available and need not be separately determined. FIG. 17 indicates that the scene changes can be detected based on P-pictures, as noted in a block 222, or by based on B-pictures, as indicated in a block 224. The output, in a block 226, is a list of scene change frames.

FIG. 18 illustrates the details included in block 222 of FIG. 17. In a block 228, the list of scene changes is initialized, as are the SeqBuf, and MedBuf buffers. Blocks 230, 232, 234, 236, 238, 240, and 242 are respectively identical to blocks 102, 104, 106, 108, 110, 112, and 114. However, in FIG. 18, a block 244 provides for determining the threshold and deciding where the scene changes occur in real time. Once all of the P-pictures are processed, a block 246 indicates that a list of scene change frames is output.

FIG. 19 illustrates the steps involved in determining the threshold and identifying the scene changes, beginning with a block 248 that indicates the current frame number and its measure are input. The steps are almost identical to those illustrated in FIG. 16, except that in FIG. 19, the threshold value is based upon the current measure and two prior measures instead of on the current measure and its past and future measures, as in FIG. 16. Specifically, when processing video data as it is contemporaneously being compressed (or decompressed), the measure for the future frame is not yet available when the threshold value is estimated. Thus, in a block 250, the median value M(t) of the three most recent measures (i.e., the measure for the current frame and the measures for two past frames, all of which are temporarily stored in the SeqBuf, is transferred into the MedBuf. Use of the measures for the two prior frames has little impact on the estimate of the threshold in a block 254. The threshold value is based on M(t) and the standard deviation σ(t) of M(t), which is determined in a block 252. A decision block 256 determines if the measure $f(t)$ is greater than the threshold, and if so, a block 258 stores the current frame number in the list of scene changes. The output in a block 260 is an updated list of the scene changes. A negative response to decision block 256 also leads to block 260.

Details of the steps implemented in block 224 of FIG. 17 are illustrated in FIG. 20. These steps are generally equivalent to those discussed above in connection with FIG. 10. In a block 262, the SeqBuf, the MedBuf, and the list of scene changes are all reset or initialized. A block 264 provides for decomposing the video sequence into a set of video slots. A decision block 266 determines if all video slots have been processed, and if not, the next video slot is obtained in a block 268. The AND or OR analysis technique is selected in a block 270. Blocks 272 and 274 generally indicate the steps in the AND analysis, the details of which are the same as discussed above. Similarly, blocks 276 and 278 generally indicate the steps of the OR analysis technique, which proceeds as discussed above. A block 280 provides for determining the threshold and identifying the scene change frames in real time. Again, the details of this block are as discussed above. In a block 282, the list of scene changes is output.

Optimizing Compressed Video Data

An overview flow chart of the optimization procedure is shown in FIG. 21, beginning with a block 86 in which the MPEG compressed video data are input. Alternatively, this procedure can be applied contemporaneously to the step of compressing (or decompressing) the video data. The first step of this procedure in a block 300 is to obtain the list of scene change frames from the compressed video data using the techniques described above. A block 302 provides for changing any P-picture following a scene change to an I-picture. This step is followed by a block 304, which calls for changing any I-picture that does not immediately follow a scene change into a P-picture.

FIG. 26 shows one example of how this procedure can be applied to an existing MPEG data steam to produce optimized MPEG compressed video data. As shown in the example, all six I-pictures are converted into P-pictures, while only two P-pictures are converted to I-pictures (at the beginning of the two scenes). A P-picture requires much less data to define it than an I-picture. As a result of applying this procedure to the relatively short sequence of frames shown in the Example, the total file size required to store the optimized MPEG compressed video data is smaller than before by four times the difference between the data size required for an I-picture and a P-picture. In addition, the newly encoded compressed video data stream allow users to non-linearly access each video scene, thereby greatly enhancing indexing operations.

For conventional MPEG video data compression, increasing the compression ratio to achieve a smaller compressed data file size results in a corresponding decrease in the quality of the video when played back using the compressed data. By applying the present invention, a smaller compressed data file can be obtained than would be possible using conventional MPEG compression. Alternatively, the technique can be applied to achieve the same size file as would result from conventional compression, but with improved playback quality. Thus, it is possible to adjust the compression ratio and/or quality as desired using the present invention, to achieve an improvement over the conventional MPEG compression technique.

When compressing video data into the MPEG format, it is desirable that the picture type be adjusted according to the video content to achieve the desired mix of improved compression and/or quality noted above. The adjustment ensures that an I-picture occurs immediately after a scene change and that a P-picture occurs right before a scene change. By ensuring that these two conditions are met, a constant bit rate for the different types of video pictures can easily be achieved. When the MPEG compressed video sequence is encoded with this type of arrangement, a video server can schedule appropriate network bandwidth for any required MPEG video by scanning the order of the frame types in the MPEG compressed video.

FIG. 22 illustrates the steps required to optimize the order of picture types for MPEG compressed video during the MPEG compression process in accordance with the present invention. As noted in a block 310, the input to the process is a video data stream. In a block 312, the number of B-pictures between two reference frames that define a video slot is determined and retained as the variable nB. A block 314 calls for setting the flag "First" equal to one and for initializing three buffers, including an input video frame buffer "InBuf," an output MPEG stream buffer "OutBuf," and the SeqBuf buffer, which is used for storing measures. Next, a block 316 provides for copying video data into InBuf. A decision block 318 determines if InBuf is empty. When InBuf is not empty, a decision block 320 checks if the number of video frames in InBuf is greater than (nB+1). If yes, a block 326 provides for marking the next (nB+1) frames as the current video slot to be encoded. If not, a block 322 changes the length of the current video slot to the number of frames, m, that remain to be processed, gets the next m frames, and marks the rest of frames as the current video slot to be encoded, i.e., sets nB equal to m−1. Next, a block 324 calls for encoding or compressing the current video slot. After encoding the current video slot, the logic moves returns to decision block 318. This process repeats until no more frames remain in InBuf. Once all frames in InBuf are processed, the logic proceeds to a block 328 in which the output is the compressed video data in OutBuf.

The details of the steps implemented in block 324 are presented in FIG. 23, beginning with a block 330, which provides for input of an n frame of a video slot. A decision block 332 checks if the n frame is the first frame in a scene, i.e., if flag First is set. If yes, a block 356 calls for encoding the first frame of the current video slot as an I-picture, and the flag First is set to zero in a block 358. A block 360 then puts the remaining frames in the video slot into InBuf and the process for the current video slot terminates in a block 364, after a block 362 in which the encoded or compressed video data are stored in OutBuf.

If the answer to the inquiry in decision block 332 is negative, a block 334 calls for encoding the last frame in the current video slot as a P-picture. A measure based on Equation (6) is generated in a block 336, and in a block 338, the measure is stored in SeqBuf. Next, a block 340 provides for determining the current threshold value. A decision block 342 determines whether the measure is greater than the threshold, to decide whether a scene change exists between the current P-picture and its past reference picture. If not, the logic proceeds to a block 354, which calls for encoding all remaining frames (between the last frame and the initial reference frame) as B-pictures. If the answer to the inquiry in decision block 342 is Yes, a block 344 provides for applying a spatial method to identify the frame where the scene change occurs. A block 346 identifies k as the last frame in the current scene. Next, a block 348 calls for changing the length of the current video slot to k and putting the rest of the frames into InBuf. The logic proceeds to a block 350 to compress or encode the current video slot. A block 352 provides for setting the flag First to one. Then, the logic advances to block 362, which puts the encoded video stream data into OutBuf, and terminates at block 364.

FIG. 24 illustrates the steps involved in determining the threshold value for the current picture. In a block 370, the frame number and measure are input. A median value, M(t), is then determined for the most recent three frames, including the current picture, from the data stored in SeqBuf, as noted in a block 372. The median value is stored in the MedBuf, in a block 374. A block 376 provides for determining the standard deviation of the current point so that in a block 378, the threshold can be determined. The output for this process is thus the threshold, as indicated in a block 380.

Details of the step referenced in block 344 of FIG. 23 are disclosed in FIG. 25, starting at a block 384 in which n video frames and an original past reference frame are input. This procedure uses a detection technique called $X^2$, which was proposed by A. Nagasaka. In a block 386, a color histogram is developed for all n frames. After the color histogram data are collected for every frame, in a block 388, a spatial matching method is used to determine all the differences between every pair of adjacent frames. The equation used to determine the function is as follows.

$$D(P_1, P_2) = \sum_{j=0}^{255} \frac{\{H(P_1, j) - H(P_2, j)\}^2}{H(P_2, j)} \quad (20)$$

where $P_1$ and $P_2$ are two contiguous frames to be tested, and $H(P_1,j)$ is the $j_{th}$ bin of the histogram corresponding to a picture $P_1$. It will be apparent that other spatial matching techniques can be used instead of the histogram described above. However, Equation (20) generates reliable results and is used in the preferred embodiment. A block 390 calls for identifying a frame k where a scene change occurs, based upon identifying two successive frames, one before and one after the scene change, that have produced maximum histogram differences. In a block 392, the output is the last frame of the current scene, i.e., the frame before the scene change that was identified in the preceding step. Since the steps preceding block 390 have shown that a scene change exists in the current video slot data, it is only necessary to identify the frame at which the scene change occurs, using the spatial method.

Graphic Comparison of the Different Analyses
Used to Identify Scene Changes

A P-picture analysis technique using the correlation between each P-picture and its past reference frame, which is based on Equation (8), and the weighted analysis technique that is based upon Equation (9) were applied to a sample MPEG compressed video stream to produce the results shown in FIGS. 27 and 29, respectively. Both analysis techniques identify seven scene changes with significant peaks. However, due to the limitations of the P-picture analyses, both techniques miss a scene change that occurred at frame number 203.

Four B-picture based analysis techniques employing Equations (7), (10), (14), (16) and (17) are applied to the same sample video data. These analysis techniques include the AND analysis without weighting, the AND analysis with weighting, the OR analysis using the number of MBs, and the OR analysis using the MB inner product. The results of these analyses are shown in FIGS. 29, 30, 31 and 32, respectively. All of these Figures identify eight significant peaks at the frames where scene changes occurred. By comparing FIGS. 29 and 30, it will be apparent why use of weighting is preferred in connection with the AND analysis technique.

To demonstrate the threshold function, another sample video sequence was used. Three of the B-picture based analysis techniques were applied to the second sample video sequence, including the AND analysis with weighting, the OR analysis using the number of MBs, and the OR analysis using the MB inner product. (The AND analysis without weighting was omitted.) In addition, the threshold function given by Equation (19) was applied to all of the results to generate a list of scene changes. The results of these analyses are shown in FIGS. 33, 34, and 35, respectively. In these Figures, the threshold function appears as a continuous line that separates the background "noise" from peak values that indicate actual scene changes. From the results shown in these Figures, it is clear that the OR type analysis techniques are better than the AND type analysis techniques, particularly in connection with video sequences that include significant motion. Both OR type analysis techniques identify all of the scene changes, but also include one false indication of a scene change where a sudden shift in luminance level appears in the sequence when an explosion occurs in the video.

Although the present invention has been described in connection with the preferred embodiments for practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for detecting a scene change in compressed video data that represent a plurality of successive video frames, comprising the steps of:
   (a) determining an interframe correlation between successive video frames of the compressed video data;
   (b) determining a measure indicative of a scene change between two successive video frames as a function of the interframe correlation between the two successive video frames; and
   (c) comparing the measure to a threshold value, and as a function of a difference between the measure and the threshold value, indicating whether the scene change has occurred between the two successive video frames.

2. The method of claim 1, further comprising the step of determining an error power between the successive video frames to serve as an additional measure indicative of a scene change.

3. The method of claim 2, wherein the step of determining the error power between successive video frames comprises the steps of:
   (a) dividing each of the successive video frames into a plurality of macroblocks, each macroblock including a defined number of contiguous pixels, said plurality of macroblocks including a plurality of forward-predicted macroblocks;
   (b) for each forward-predicted macroblock comprising the successive video frames:
      (i) applying a discrete cosine transform to at least a portion of the forward-predicted macroblock to determine a plurality of spectral components; and
      (ii) determining a sum of the spectral components of the forward-predicted macroblock squared, said sum being equal to a total error power of the forward-predicted macroblock; and
   (c) determining an average total error power for each of the successive video frames by summing the total error power for the forward-predicted macroblocks in each video frame to produce a video frame error power and dividing the video frame error power by the number of forward-predicted macroblocks for which the total error power was summed, so that there is an indication that a scene cut occurred between an immediately previous video frame and a current video frame if said average total error power for the current frame exceeds the threshold.

4. The method of claim 1, wherein the compressed video data represent the successive video frames using intra-pictures (I-pictures), predicted-pictures (P-pictures), and bidirectional-predicted pictures (B-pictures), each of said I-pictures being independent of any other type of pictures, each of said P-pictures being related to a previous I-picture or a previous P-picture, and each of said B-pictures being related to the previous I-picture or P-picture and to a next I-picture or a next P-picture, wherein the step of determining the interframe correlation between successive video frames comprises the steps of:
   (a) dividing each of the I-pictures, P-pictures, and B-pictures into a number N(T) of macroblocks, each macroblock including a defined number of contiguous pixels, each of said P-pictures including a number N(F) of forward-predicted macroblocks, and each of said B-pictures including in addition, a number N(B) of backward-predicted macroblocks and a number N(A) of bidirectional-predicted macroblocks;

(b) for each P-picture, determining the interframe correlation between the P-picture and a past reference picture, said interframe correlation being equal to N(F)/N(T); and (c) for each B-picture, determining an indicator of scene changes between the B-picture and one of a past reference picture and a future reference picture for the B-picture as a function of the interframe correlation between the past reference picture and the future reference picture of the B-picture.

5. The method of claim 4, wherein said indicator comprises a function of a difference D, which is equal to N(F)–N(B) for the B-picture.

6. The method of claim 5, wherein the difference D is weighted, producing a weighted difference W(D), which is equal to D/N(A) for the B-picture.

7. The method of claim 4, wherein the interframe correlation between each B-picture and its past reference picture, C(P), is a function of N(F), N(A), and N(T); and wherein the interframe correlation between each B-picture and its future reference picture, C(F), is a function of N(B), N(A), and N(T).

8. The method of claim 7, wherein a measure of continuity for the B-picture is equal to a minimum of C(P) and C(F) for the B-picture.

9. The method of claim 8, wherein the indicator of the scene change between the B-picture and one of its past and future reference pictures is an inverse of the measure of continuity for the B-picture.

10. The method of claim 4, wherein the interframe correlation for the B-picture is determined as a function of motion vectors between contiguous macroblocks in the B-picture.

11. The method of claim 1, further comprising the step of adaptively determining the threshold as a time varying function of the measure.

12. The method of claim 11, wherein the step of adaptively determining the threshold comprises the steps of:

(a) filtering the measure over time to remove peaks in the measure, producing a time varying filtered signal; and (b) determining the threshold as a function of the time varying filtered signal.

13. The method of claim 11, wherein the compressed video data are motion compensated before being processed to detect the scene change.

14. The method of claim 13, wherein the threshold is a function of at least a current measure, a past measure, and a future measure relative to a current video frame.

15. The method of claim 11, wherein the compressed video data are processed to detect the scene change before a compression process is completed.

16. The method of claim 15, wherein the threshold is a function of a current measure and a plurality of past measures.

17. The method of claim 1, further comprising the step of generating a list of scene changes, each scene change being identified by reference to a video frame number.

18. A system for detecting scene changes in compressed video data representing a plurality of successive video frames, comprising:

(a) a processor that executes machine instructions embodied in software, to carry out processing of the video data so as to implement functions that are determined by the machine instructions;

(b) a volatile memory that is accessible by the processor, for temporarily storing the machine instructions executed by the processor and for temporarily storing the video data;

(c) a nonvolatile storage device for storing the machine instructions executed by the processor and for storing the compressed video data and output data that include a list of the scene changes detected in the compressed video data; and (d) said machine instructions causing the processor to implement the following functions:

(i) determine an interframe correlation between successive video frames;

(ii) determine a measure indicative of a scene change between two successive video frames as a function of the interframe correlation between the two successive video frames;

(iii) compare the measure to a threshold value, and as a function of a difference between the measure and the threshold value, indicate whether the scene change has occurred between the two successive video frames; and (iv) add the scene change to the list of scene changes for the compressed video data.

19. An article of manufacture that is adapted for use by a computer to detect a scene change in compressed video data representing a plurality of successive video frames, comprising:

a nonvolatile memory device in which are stored a plurality of machine instructions that are executable by the computer, said plurality of machine instructions comprising a computer program that causes the computer to implement the following functions:

(a) determine an interframe correlation between successive video frames of the compressed video data;

(b) determine a measure indicative of a scene change between two successive video frames as a function of the interframe correlation between the two successive video frames; and (c) compare the measure to a threshold value, and as a function of a difference between the measure and the threshold value, indicate whether the scene change has occurred between the two successive video frames.

20. A method for increasing at least one of a compression and a quality of compressed video data that represent successive video frames, said compressed video data including intra-pictures (I-pictures), predicted-pictures (P-pictures), and bidirectional-predicted pictures (B-pictures), said I-pictures each being independent of any other type of picture, said P-pictures each being related to a previous I-picture or a previous P-picture, and said B-pictures each being related to the previous I-picture or the previous P-picture and to a next I-picture or a next P-picture, said method comprising the steps of:

(a) identifying scene changes between successive video frames of the compressed video;

(b) ensuring that I-pictures always immediately follow a scene change and do not occur at any other points in the compressed video data; and (c) ensuring that P-pictures do not immediately follow a scene change.

21. The method of claim 20, wherein the compressed video data are produced in a contemporaneous process, just before steps (a) through (c).

22. The method of claim 21, wherein the step of identifying scene changes between successive video frames comprises the step of using spatial matching between successive video frames of a video slot to determine the video frame within the video slot at which a scene change occurs.

23. The method of claim 22, wherein the step of using spatial matching comprises the steps of:
   (a) determining color histograms for each video frame comprising a video slot, each color histogram comprising a plurality of color bins that indicate a frequency for a use of each of a plurality of colors in the video frame;
   (b) determining differences between corresponding bins of the color histograms for successive video frames within the video slot; and
   (c) identifying a scene change where the differences between the corresponding bins of the color histograms for two successive video frames is a maximum.

24. The method of claim 20, wherein the compressed video data are produced in a separate process that is generally not contemporaneous with steps (a) through (c), which are subsequently executed.

25. The method of claim 24, wherein the step of ensuring that I-pictures always immediately follow a scene change comprises the step of changing any I-picture that does not immediately follow a scene change to a P-picture, and wherein the step of ensuring that P-pictures do not immediately follow a scene change comprises the step of changing any P-picture that immediately follows a scene change to an I-picture.

26. The method of claim 20, further comprising the step of identifying video slots, each video slot including a plurality of video frames, each video slot beginning and ending with a reference frame, each reference frame comprising one of an I-picture and a P-picture.

27. The method of claim 26, wherein all video frames occurring between reference frames at the beginning and the end of a video slot are encoded in the compressed video data as B-pictures.

28. A system for increasing at least one of a compression and a quality of compressed video data that represent successive video frames, said compressed video data including intra-pictures (I-pictures) and predicted-pictures (P-pictures), said I-pictures each being independent of any other type of picture, and said P-pictures each being related to a previous I-picture or a previous P-picture, said system comprising:

(a) a processor that executes machine instructions embodied in software, to carry out processing of the video data so as to implement functions that are determined by the machine instructions;
(b) a volatile memory that is accessible by the processor, for temporarily storing the machine instructions executed by the processor and for temporarily storing the compressed video data;
(c) a nonvolatile storage device for storing the machine instruction executed by the processor and for storing the compressed video data; and
(d) said machine instructions causing the processor to implement the following functions:
   (i) identify scene changes between successive video frames;
   (ii) ensure that the I-pictures always immediately follow a scene change and do not occur at any other points in the compressed video data; and
   (iii) ensure that the P-pictures do not immediately follow a scene change.

29. An article of manufacture that is adapted for use by a computer to detect a scene change in compressed video data representing a plurality of successive video frames, said compressed video data including intra-pictures (I-pictures) and predicted-pictures (P-pictures), said I-pictures each being independent of any other type of picture and said P-pictures each being related to a previous I-picture or a previous P-picture, said article of manufacture comprising:

a nonvolatile memory device in which are stored a plurality of machine instructions that are executable by the computer, said plurality of machine instructions comprising a computer program that cause the computer to implement the following functions:
   (a) identify scene changes between successive video frames;
   (b) ensure that the I-pictures always immediately follow a scene change and do not occur at any other points in the compressed video data; and
   (c) ensure that the P-pictures do not immediately follow a scene change.

* * * * *